United States Patent
Kim et al.

(10) Patent No.: US 9,509,475 B2
(45) Date of Patent: Nov. 29, 2016

(54) METHOD AND APPARATUS FOR TRANSMITTING AND RECEIVING DATA

(71) Applicant: LG ELECTRONICS INC., Seoul (KR)

(72) Inventors: Bonghoe Kim, Seoul (KR); Yunjung Yi, Seoul (KR); Suckchel Yang, Seoul (KR); Joonkui Ahn, Seoul (KR); Dongyoun Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/419,615

(22) PCT Filed: Sep. 9, 2013

(86) PCT No.: PCT/KR2013/008114
§ 371 (c)(1),
(2) Date: Feb. 4, 2015

(87) PCT Pub. No.: WO2014/038901
PCT Pub. Date: Mar. 13, 2014

(65) Prior Publication Data
US 2015/0195070 A1 Jul. 9, 2015

Related U.S. Application Data

(60) Provisional application No. 61/698,720, filed on Sep. 9, 2012.

(51) Int. Cl.
*H04L 5/00* (2006.01)
*H04L 1/00* (2006.01)
*H04J 11/00* (2006.01)
*H04L 25/02* (2006.01)

(52) U.S. Cl.
CPC .......... *H04L 5/0053* (2013.01); *H04J 11/0093* (2013.01); *H04L 1/0027* (2013.01); *H04L 5/0048* (2013.01); *H04L 5/0091* (2013.01); *H04L 5/001* (2013.01); *H04L 5/0055* (2013.01); CPC ......... *H04L 5/0057* (2013.01); *H04L 25/0224* (2013.01)

(58) Field of Classification Search
None
See application file for complete search history.

(56) References Cited

U.S. PATENT DOCUMENTS

| | | | |
|---|---|---|---|
| 2011/0235743 A1* | 9/2011 | Lee ................ | H04L 5/0048 375/295 |
| 2012/0120910 A1* | 5/2012 | Mazzarese ........ | H04L 5/0023 370/330 |
| 2012/0207047 A1 | 8/2012 | Liao et al. | |

(Continued)

FOREIGN PATENT DOCUMENTS

| WO | WO 2012/008815 A2 | 1/2012 |
|---|---|---|
| WO | WO 2012/074305 A2 | 6/2012 |

OTHER PUBLICATIONS

Technical Specification, "3rd Generation Partnership Project; Technical Specification Group Radio Access Network; Evolved Universal Terrestrial Radio Access (E-UTRA); Physical layer procedures (Release 10)", 3GPP TS 36.213, V10.6.0, (Jun. 2012).

*Primary Examiner* — Hong Cho
(74) *Attorney, Agent, or Firm* — Birch, Stewart, Kolasch & Birch, LLP

(57) ABSTRACT

Disclosed are a method and an apparatus for transmitting and receiving data. A method for transmitting an uplink comprises the steps of: a terminal receiving periodic channel state information (CSI) configuration information; the terminal determining an uplink subframe according to the periodic CSI configuration information; and the terminal transmitting a periodic CSI through the uplink subframe, wherein the periodic CSI configuration information may include information regarding a period, subframe offset, and a reference cell to which a wireless frame number is applied.

8 Claims, 26 Drawing Sheets

(56) References Cited

U.S. PATENT DOCUMENTS

| | | |
|---|---|---|
| 2012/0220286 A1 | 8/2012 | Chen et al. |
| 2013/0114554 A1 | 5/2013 | Yang et al. |
| 2013/0250903 A1 | 9/2013 | Ahn et al. |
| 2013/0301467 A1* | 11/2013 | Kang ................ H04B 7/024 370/252 |

* cited by examiner

FIG. 17

Cell specific SRS subframe (period T=2)

| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |

UE specific SRS subframe (period T=10)

| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |

METHOD AND APPARATUS FOR TRANSMITTING AND RECEIVING DATA

CROSS REFERENCE TO RELATED APPLICATIONS

This application is the National Phase of PCT International Application No. PCT/KR2013/008114 filed on Sep. 9, 2013, which claims priority under 35 U.S.C. 119(e) to U.S. Provisional Application No. 61/698,720 filed on Sep. 9, 2012, all of which are hereby expressly incorporated by reference into the present application.

BACKGROUND OF THE INVENTION

1. Field of the Invention

The present invention relates to wireless communications, and more specifically, a method and apparatus for transmitting and receiving data.

2. Related Art

3GPP (3rd Generation Partnership Project) TS (Technical Specification) Release 8-based LTE (long term evolution) is a key next-generation communication standard.

As set forth in 3GPP TS 36.211 V8.7.0 (2009-05) "Evolved Universal Terrestrial Radio Access (E-UTRA); Physical Channels and Modulation (Release 8),", physical channels in LTE systems may be divided into downlink channels such as PDSCH (Physical Downlink Shared Channel) and PDCCH (Physical Downlink Control Channel) and uplink channels such as PUSCH (Physical Uplink Shared Channel) and PUCCH (Physical Uplink Control Channel).

PUCCH is an uplink control channel used for transmitting uplink control information including HARQ (hybrid automatic repeat request), ACK/NACK signals, CQI (Channel Quality Indicator), or SR (scheduling request).

Meanwhile, 3GPP LTE-A (advanced), an evolution version of 3GPP LTE, is being developed. 3GPP LTE-A systems adopt carrier aggregation and MIMO (multiple input multiple output) supportive of four or more antenna ports.

Carrier aggregation uses multiple component carriers. Each component carrier is defined with a center frequency and a bandwidth. One downlink component carrier or a pair of uplink component carrier and downlink component carrier corresponds to one cell. If a UE receives a service using a plurality of downlink CCs, the UE may be said to receive the service from a plurality of serving cells.

TDD (time division duplex) systems use the same frequency for downlink and uplink. Accordingly, an uplink sub-frame is associated with one or more downlink sub-frames. The term "association" means that transmission/reception in a downlink sub-frame are associated with transmission/reception in an uplink sub-frame. For example, when receiving transport blocks in a plurality of sub-frames, the UE transmits HARQs or ACKs/NACKs for the transport blocks in an uplink sub-frame associated with the plurality of downlink sub-frames.

SUMMARY OF THE INVENTION

An object of the present invention is to provide a method for transmitting data.

Another object of the present invention is to provide an apparatus for transmitting data.

To achieve the above objects, according to an aspect of the present invention, an uplink transmission method may comprise receiving periodic CSI (channel state information) configuration information, by a user equipment (UE); determining an uplink sub-frame according to the periodic CSI configuration information, by the UE; and transmitting periodic CSI through the uplink sub-frame, by the UE, wherein the periodic CSI configuration information includes information on a period, a sub-frame offset, and a reference cell applied with a radio frame number, wherein the uplink sub-frame meets a following equation, $$(10 \times n_f + \lfloor n_s/2 \rfloor - N_{OFFSET,CQI}) \bmod (N_{pd}) = 0$$

wherein $N_{OFFSET,CQI}$ is the sub-frame offset, $N_{pd}$ the period, $n_f$ is the radio frame number corresponding to the reference cell, $n_s$ is a slot number in a radio frame corresponding to the radio frame number.

To achieve the above objects, according to an aspect of the present invention, a user equipment (UE) in a wireless communication system may comprise a radio frequency (RF) unit receiving a radio signal; a processor selectively connected with the RF unit, wherein the processor is implemented to receive periodic CSI (channel state information) configuration information, determine an uplink sub-frame according to the periodic CSI configuration information, and transmit periodic CSI through the uplink sub-frame, the periodic CSI configuration information includes information on a period, a sub-frame offset, and a reference cell applied with a radio frame number, wherein the uplink sub-frame meets a following equation, $$(10 \times n_f + \lfloor n_s/2 \rfloor - N_{OFFSET,CQI}) \bmod (N_{pd}) = 0$$

wherein $N_{OFFSET,CQI}$ is the sub-frame offset, $N_{pd}$ is the period, $n_f$ is the radio frame number corresponding to the reference cell, $n_s$ is a slot number in a radio frame corresponding to the radio frame number.

Data transmission efficiency may be increased.

BRIEF DESCRIPTION OF THE DRAWINGS

FIG. 17 illustrates an example of periodic SRS transmission.

DESCRIPTION OF EXEMPLARY EMBODIMENTS

A user equipment (UE) may be fixed or mobile, and may be referred to as another terminology, such as a user equipment (UE), a mobile station (MS), a mobile terminal (MT), a user terminal (UT), a subscriber station (SS), a wireless device, a personal digital assistant (PDA), a wireless modem, a handheld device, a terminal, a wireless terminal, etc.

A base station (BS) is generally a fixed station that communicates with the UE and may be referred to as another terminology, such as an evolved Node-B (eNB), a base transceiver system (BTS), an access point, etc.

Figure 1:
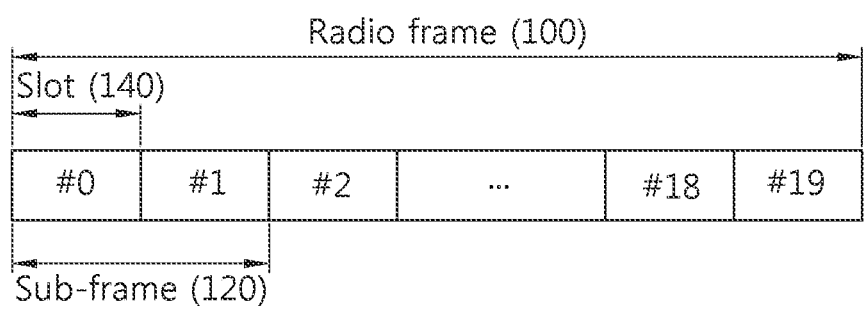
FIG. 1 illustrates the structure of a radio frame in LTE.

FIG. 1 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008 March).

Referring to FIG. 1, the radio frame includes 10 subframes 120, and one subframe includes two slots 140. The radio frame may be indexed based on slot 140, that is, from slot #0 to #19 or may be indexed based on subframe 120, that is, from subframe #0 to subframe #9. For example, subframe #0 may include slot #0 and slot #1.

A time taken for transmitting one subframe 120 is called a transmission time interval (TTI). The TTI may be a scheduling basis for a data transmission. For example, a radio frame may have a length of 10 ms, a subframe may have a length of 1 ms, and a slot may have a length of 0.5 ms.

One slot 140 includes a plurality of orthogonal frequency division multiplexing (OFDM) symbols in a time domain and a plurality of subcarriers in a frequency domain. In LTE, a BS uses OFDMA as an access method in downlink channel. The OFDM symbols are used to express a symbol period, and may be called by other names depending on a multiple-access scheme. For example, in an uplink channel in which a wireless device transmits data to a BS, a single carrier-frequency division multiple access (SC-FDMA) may be used. The symbol section in which data is transmitted through uplink channel may be referred to as a SC-FDMA symbol.

The structure of radio frame 100 introduced in FIG. 1 is an embodiment for the frame structure. Accordingly, new radio frame format may be defined by changing the number of subframes 120, the number of slots 140 included in the subframe 120, or the number of OFDM symbols included in the slot 140.

In the radio frame structure, the number of symbols included in a slot may be changed depending on which cyclic prefix (CP) is used. For example, when the radio frame uses a normal CP, one slot may include seven OFDM symbols. When the radio frame uses an extended CP, one slot may include six OFDM symbols.

The wireless communication system may be divided into a frequency division duplex (FDD) scheme and a time division duplex (TDD) scheme. According to the FDD scheme, an uplink transmission and a downlink transmission may be performed based on different frequency bands. According to the TDD scheme, an uplink transmission and a downlink transmission may be performed based on the same frequency band by using time division scheme. A channel response of the TDD scheme is substantially reciprocal since it uses the came frequency hand. That is, in TDD scheme, a downlink channel response and an uplink channel response are almost the same in a given frequency band. Thus, the TDD-based wireless communication system may obtain the channel state information from the channel state information of uplink channel. In the TDD scheme, the entire frequency band is time-divided for uplink and downlink transmissions, so a downlink transmission by the BS and an uplink transmission by the wireless device cannot be simultaneously performed.

Figure 2:
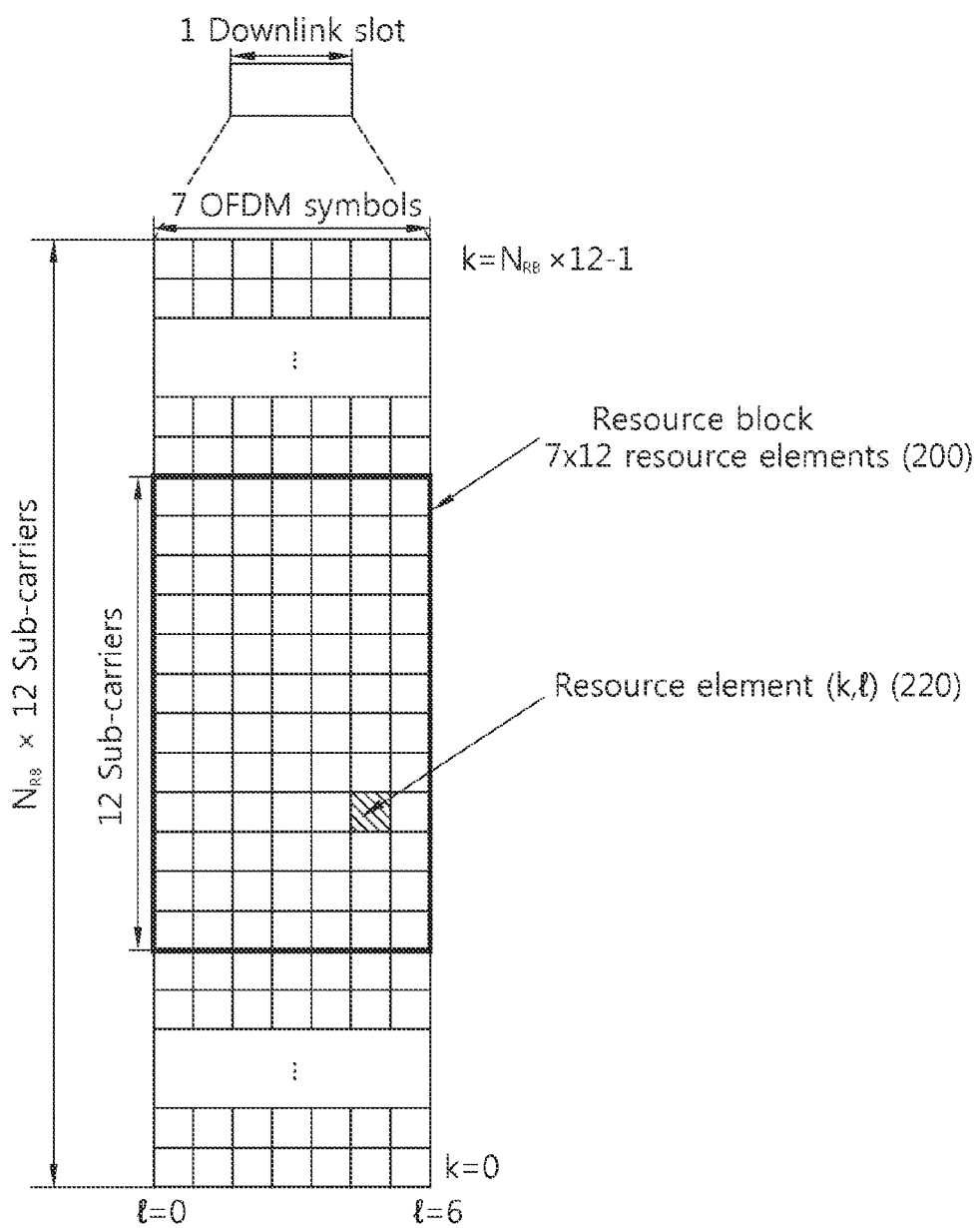
FIG. 2 illustrates an exemplary resource grid for a downlink slot.

FIG. 2 is a view illustrating an example of a resource grid for a downlink slot.

The downlink slot includes multiple OFDM symbols in a time domain, and includes NRB resource blocks in a frequency domain. NRB as a number of a resource block within the downlink slot is determined depending on downlink transmission bandwidth configured at a cell. For example, In a LTE system, NRB may be a value of 6 to 110 according to transmission bandwidth in use. A resource block 200 may include a plurality of subcarriers in the frequency domain. An uplink slot may have a structure same as that of the downlink slot.

Each element on the resource grid is referred to as a resource element 200. The resource element 220 on the resource grid can be identified by an index pair (k, l). Here, k (k=0, . . . , NRB×12−1) is the index of the subcarrier in the frequency domain, and l (l=0, . . . , 6) is the indices of the OFDM symbols in the time domain.

Here, one resource block 200 may include 7 OFDM symbols in the time domain and 7×12 resource elements 220 composed of 12 subcarriers in the frequency domain. Such size is just an example, and it is possible that the number of subcarriers and OFDM symbols constructing one resource block 200 varies. The resource block pair indicates a resource unit including two resource blocks.

The number of the OFDM symbols included in one slot may vary depending on CP as mentioned above. In addition, the number of the resource block included in one slot may vary according to the size of the entire frequency bandwidth.

Figure 3:
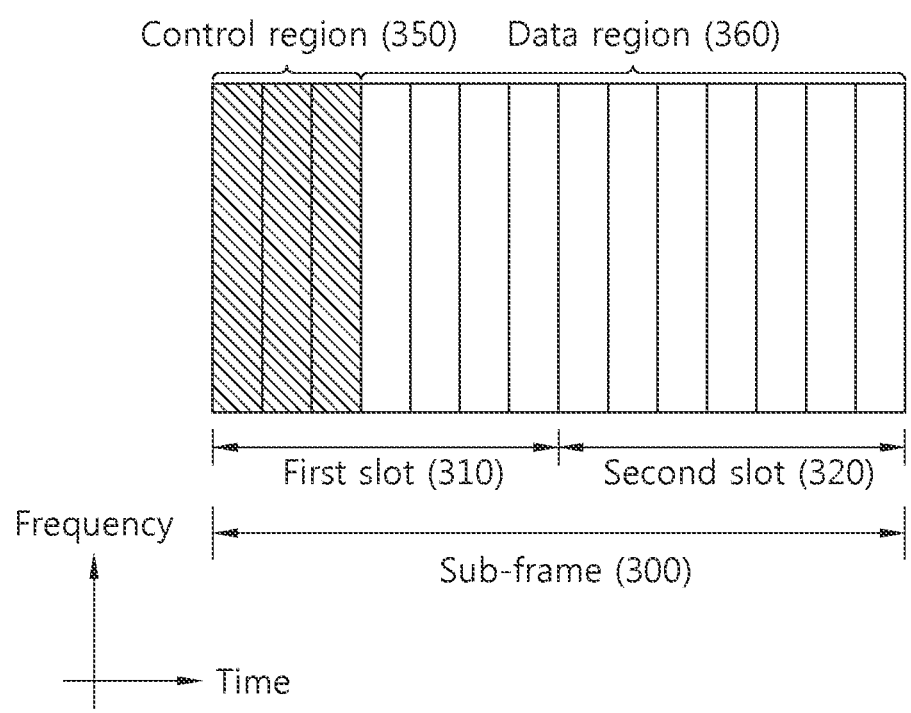
FIG. 3 illustrates the structure of a downlink sub-frame.

FIG. 3 is a view illustrating the structure of a downlink subframe.

The downlink subframe may be identified by two slots 310, 320 based on time. Each slot 310 or 320 includes 7

OFDM symbols in a normal CP. A resource region corresponding to 3 OFDM symbols (maximum 4 OFDM symbols for 1.4 MHz bandwidth), which arrive first, in the first slot may be used as a control region 350. Remaining OFDM symbols may be used as a data region 360 to which a traffic channel such as a physical downlink shared channel (PDSCH) is assigned.

PDCCH, for example, may be the control channel for transmitting information on resource allocation and a transmit format in a downlink-shared channel (DL-SCH), uplink shared channel (UL-SCH) resource allocation, information on paging on PCH, information on a system on the DL-SCH, and information on resource allocation for upper layer control messages such as random access response over the PDSCH, a transmit power control command set for individual UEs within a random UE group and voice over internet protocol (VoIP) activation. Multiple units for transmitting PDCCH data may be defined within the control region 350. A UE may monitor a plurality of units for transmitting PDCCH data to obtain control data. For example, PDCCH data may be transmitted to the UE based on an aggregation of one or more continuous control channel elements (CCE). The CCE may be one unit for transmitting PDCCH data. The CCE may include a plurality of resource element groups. The resource element group is a resource unit including available 4 resource elements.

A base station determines a PDCCH format based on downlink control information (DCI), and attaches a cyclic redundancy check (CRC) to the control information. The CRC is masked with a unique identifier (referred to as a radio network temporary identifier (RNTI)) according to an owner or a usage. If PDCCH is for a specific UE, a unique identifier of the UE, e.g., C-RNTI (cell-RNTI), may be masked to the CRC. IF PDCCH is for a paging message, an identifier indicating paging, e.g., P-RNTI (paging-RNTI), may be masked to the CRC. If PDCCH is for a system information block (SIB), a system information-RNTI (SI-RNTI)) may be masked to the CRC. In order to indicate random access response as response for a random access preamble of a UE, a random access-RNTI may be masked to the CRC.

Figure 4:
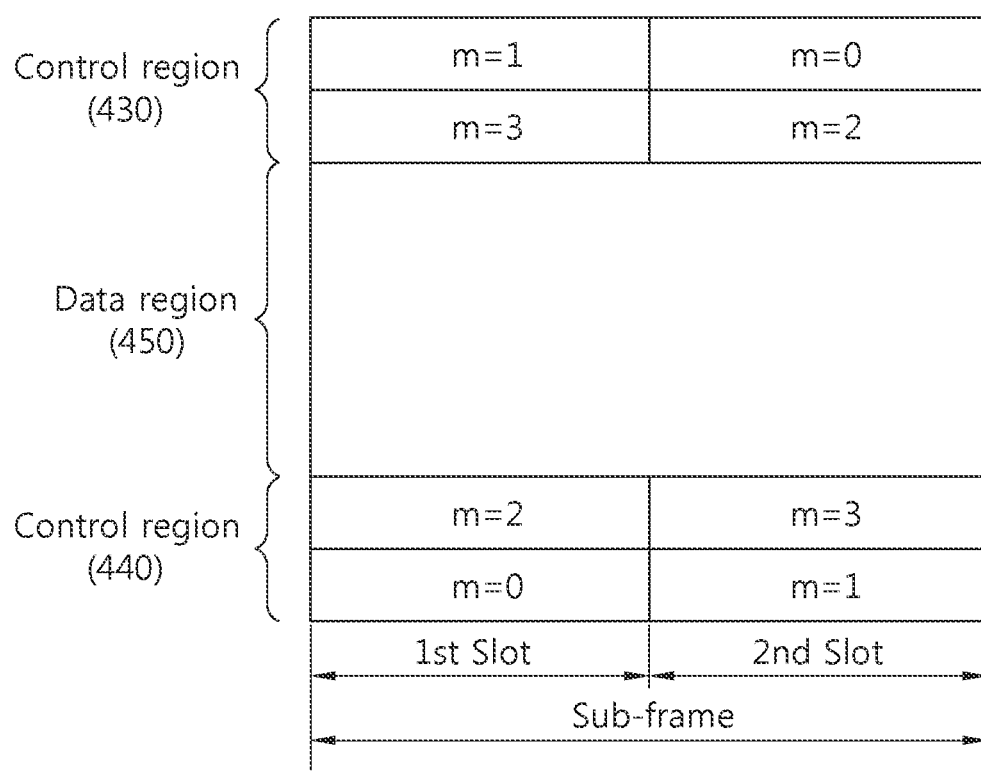
FIG. 4 illustrates the structure of a TDD mode radio frame in 3GPP LTE.

FIG. 4 shows a downlink radio frame structure in TDD mode.

For the downlink radio frame structure in TDD mode, the section 4 of 3GPP TS 36.211 V8.7.0 (2009 May) "Evolved Universal Terrestrial Radio Access (E-UTRA); Physical Channels and Modulation (Release 8)" may be referred and the downlink radio frame structure in TDD mode is related to a time division duplex (TDD).

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and downlink.

In TDD, a downlink (DL) subframe and an uplink (UL) subframe co-exist in one radio frame. Table 1 shows an example of a configuration of the radio frame.

TABLE 1

| Uplink-downlink configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes a special subframe. When the UL-DL configuration is received from the BS, the UE can know whether a specific subframe is the DL subframe or the UL subframe according to the configuration of the radio frame.

The PCFICH transmitted in a first OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Figure 5:
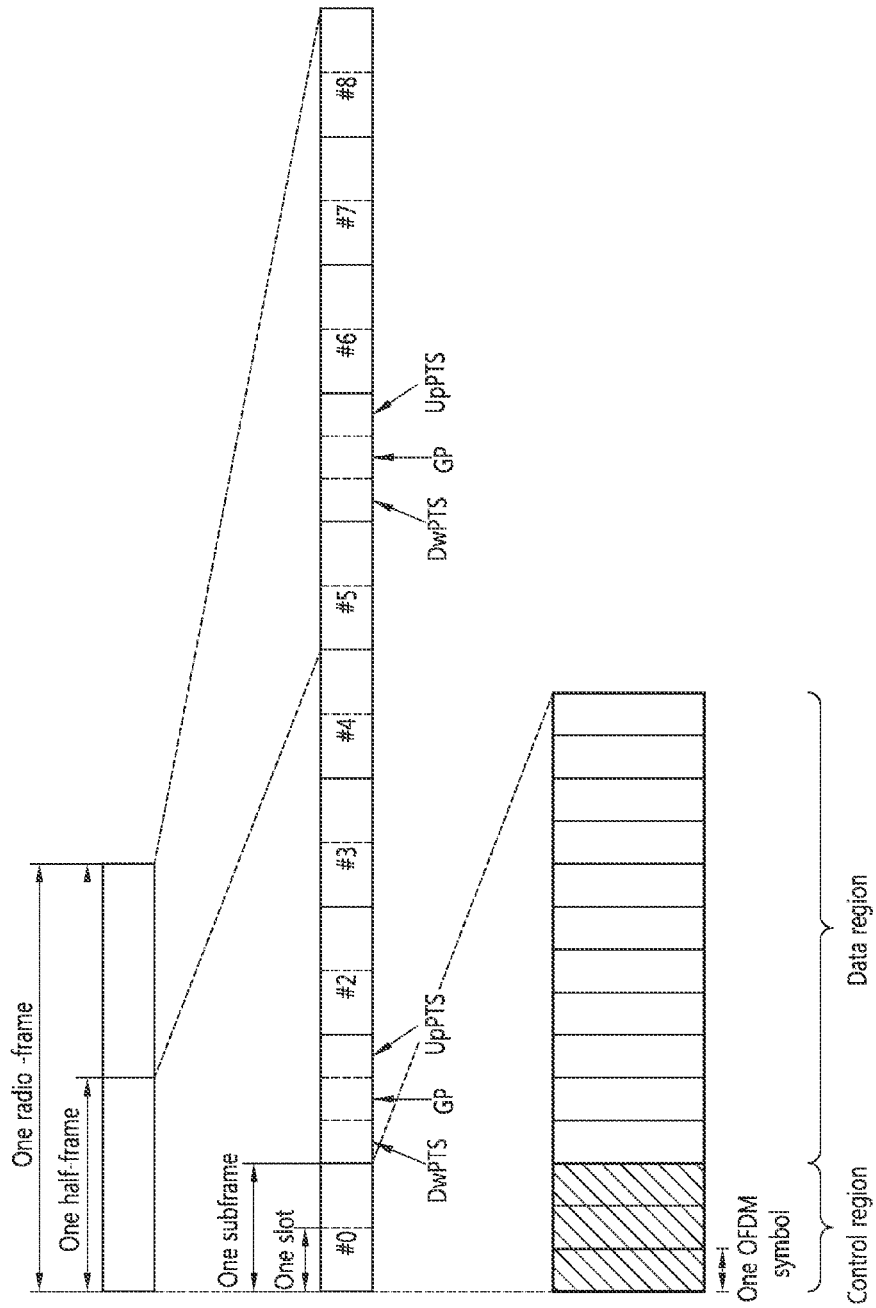
FIG. 5 illustrates the structure of an uplink sub-frame in 3GPP LTE.

FIG. 5 is a view illustrating the structure of an uplink subframe in 3GPP LTE.

The uplink subframe may be divided into a control region allocated to a physical uplink control channel (PUCCH) for delivering uplink control information and a data region allocated to a physical uplink shared channel (PUSCH) for delivering user data. PUCCH resources for allocation may be located at the edge of bandwidth of a component carrier (CC).

The PUCCH may be allocated based on a RB pair in the subframe. RBs corresponding to the RB pair may be allocated to different subcarriers in a first and a second slots respectively. m is a position index indicating the position of a logical frequency domain of the RB pair which is allocated to the PUCCH in the subframe. RBs having the same value of m are allocated to different subcarriers of the first and second slots.

According to 3GPP TS 36.211 V8.7.0, the PUCCH may have various formats. It is possible to use Different PUCCH formats with different bit numbers in the subframe according to a modulation scheme for use in the PUCCH format.

Table 2 shows an example of bit numbers per subframe and the modulation scheme according to the PUCCH format.

TABLE 2

| PUCCH format | Modulation scheme | bit number per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

PUCCH format 1 for scheduling request (SR) transmission, PUCCH format 1a/1b for transmitting an ACK/NACK signal for HARQ, PUCCH format 2 for CQI transmission, and PUCCH format 2a/2b for simultaneous transmission of the CQI and the ACK/NACK signals are used. When only the ACK/NACK signal is transmitted in the subframe, PUCCH format 1a/1b is used, and when only the SR is transmitted, PUCCH format 1 is used. When the SR and the ACK/NACK signal are transmitted simultaneously, PUCCH format 1 is used, and the ACK/NACK signal is transmitted after being modulated to resources allocated to the SR.

The entire PUCCH formats use cyclic shift (CS) of a sequence for each OFDM symbol. A base sequence is cyclically shifted by specific CS amount to generate a cyclic shift sequence. The specific CS amount is indicated by a CS index.

The sequence length is equal to the number of an element included in the sequence. The sequence index for indicating the sequence may be determined based on a cell identifier, a slot number within a radio frame, and the like. Assuming that a base sequence is mapped to one resource block in the frequency domain, one resource block includes 12 subcarriers, and thus the length of the base sequence N is 12. The cyclic shift sequence may be generated by cyclically shifting the base sequence.

The available cyclic shift index to the base sequence may be induced from the base sequence based on a CS interval. For example, when the base sequence length is 12 and the CS interval is 2, total number of the available cyclic shift indices to the base sequence is 6. Hereinafter, HARQ ACK/NACK signal transmission in PUCCH format 1b will be described.

Figure 6:
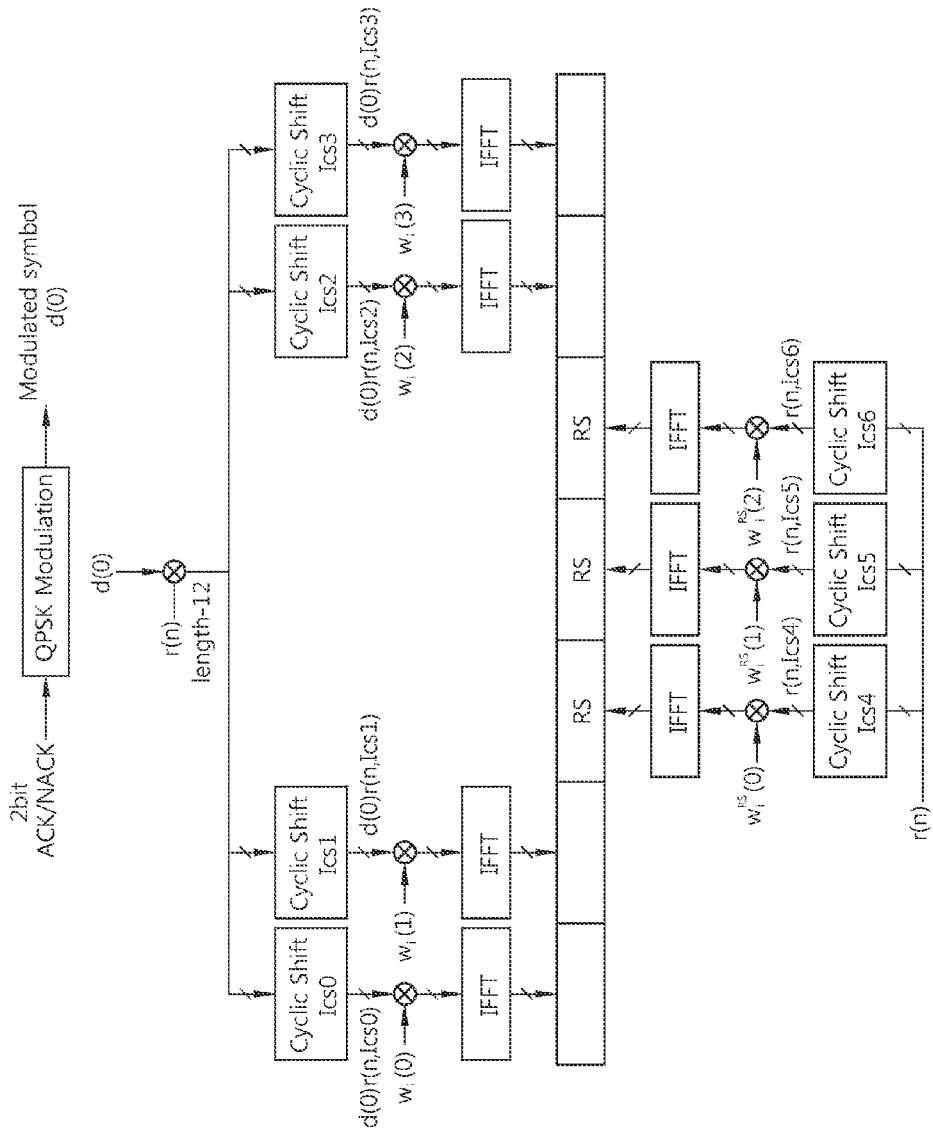
FIG. 6 illustrates normal CP PUCCH format 1b in 3GPP LTE.

FIG. 6 illustrates normal CP PUCCH format 1b in 3GPP LTE.

One slot includes seven OFDM symbols, three of which are RS OFDM symbols for reference signal and the other four are data OFDM symbols for ACK/NACK signal.

In PUCCH format 1b, an encoded two-bit ACK/NACK signal is QPSK (Quadrature Phase Shift Keying) modulated to generate a modulated symbol d(0).

A cyclic shift index $I_{CS}$ may vary depending on slot numbers ($n_s$) in the radio frame and/or symbol indexes in the slot.

In normal CP one slot includes four OFDM symbols for transmission of an ACK/NACK signal. Thus, assume that a corresponding cyclic shift index in each data OFDM symbol is $I_{CS0}$, $I_{CS1}$, $I_{CS2}$, $I_{CS3}$.

The modulated symbol d(0) is spread into a cyclic-shifted sequence r(n, $I_{CS}$). Assuming that a one-dimensional spread sequence corresponding to the (i+1)th OFDM symbol in the slot is m(i), it may be represented as {m(0), m(1), m(2), m(3)}={d(0)r(n, $I_{cs0}$), d(0)r(n, $I_{cs1}$), d(0)r(n, $I_{cs2}$), d(0)r(n, $I_{cs3}$)}.

For the UE's increased capability, the one-dimensional spread sequence may be spread using an orthogonal sequence. As the orthogonal sequence with a spreading factor (K)=4, $w_i(k)$ (i is a sequence index, 0≤k≤K−1), the following comes in use.

TABLE 3

| index | [$w_i(0)$, $w_i(1)$, $w_i(2)$, $w_i(3)$] |
|---|---|
| 0 | [+1 +1 +1 +1] |
| 1 | [+1 −1 +1 −1] |
| 2 | [+1 −1 −1 +1] |

As the orthogonal sequence with a spreading factor (K)=3, $w_i(k)$ (i is a sequence index, 0≤k≤K−1), the following sequence is used.

TABLE 4

| index | [$w_i(0)$, $w_i(1)$, $w_i(2)$] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

A different spread coefficient may be used for each slot. Accordingly, given any orthogonal sequence index i, two-dimensional spread sequence {s(0), s(1), s(2), s(3)} may be represented as follows: {s(0), s(1), s(2), s(3)}={$w_i(0)$m(0), $w_i(1)$m(1), $w_i(2)$m(2), $w_i(3)$m(3)}

Two-dimensional spread sequences {s(0), s(1), s(2), s(3)} are subjected to IFFT (inverse fast fourier transform) and are then transmitted in their corresponding OFDM symbols. By such method, an ACK/NACK signal may be transmitted on a PUCCH.

For transmission of a PUCCH format 1b reference signal, a reference sequence r(n) is cyclic-shifted and is then spread with an orthogonal sequence. Assuming that a cyclic shift index corresponding to three RS OFDM symbols is $I_{cs4}$, $I_{cs5}$, $I_{cs6}$, three cyclic-shifted sequences r(n,$I_{cs4}$),r(n,$I_{cs5}$),r(n,$I_{cs6}$) may be acquired. The three cyclic shifted sequences are spread with an orthogonal sequence with K=3, $w_i^{rs}(k)$.

The orthogonal sequence index i, cyclic shift index $I_{cs}$, and resource block index m are parameters for configuring a PUCCH and are resources to distinguish PUCCHs (or UEs). Assuming that the number of available cyclic shifts is 12 and the number of available orthogonal sequence indexes is 3, PUCCHs for a total of 36 UEs may be multiplexed in a single resource block.

In 3GPP LTE, a UE may induce, e.g., the above-described orthogonal sequence index i or cyclic shift index $I_{cs}$ that constitutes a PUCCH by using a resource index $n_{PUCCH}^{(1)}$. The resource index may be defined as equation $n_{PUCCH}^{(1)}=n_{CCE}+N_{PUCCH}^{(1)}$. $n_{CCE}$ is the number of a first CCE used for transmission of its corresponding DCI (i.e., a downlink resource allocation used for reception of downlink data corresponding to an ACK/NACK signal), and $N_{PUCCH}^{(1)}$ is a parameter provided by the base station to the UE through a higher layer message.

Time, frequency, or code resources used for transmission of ACK/NACK signals are referred to as ACK/NACK resources or PUCCH resources. As described above, the index of an ACK/NACK resource (referred to as an ACK/NACK resource index or PUCCH index) necessary to transmit an ACK/NACK signal on a PUCCH may be represented as at least one of orthogonal sequence index i, cyclic shift index $I_{cs}$, resource block index m, and an index for obtaining the three indexes.

Figure 7:
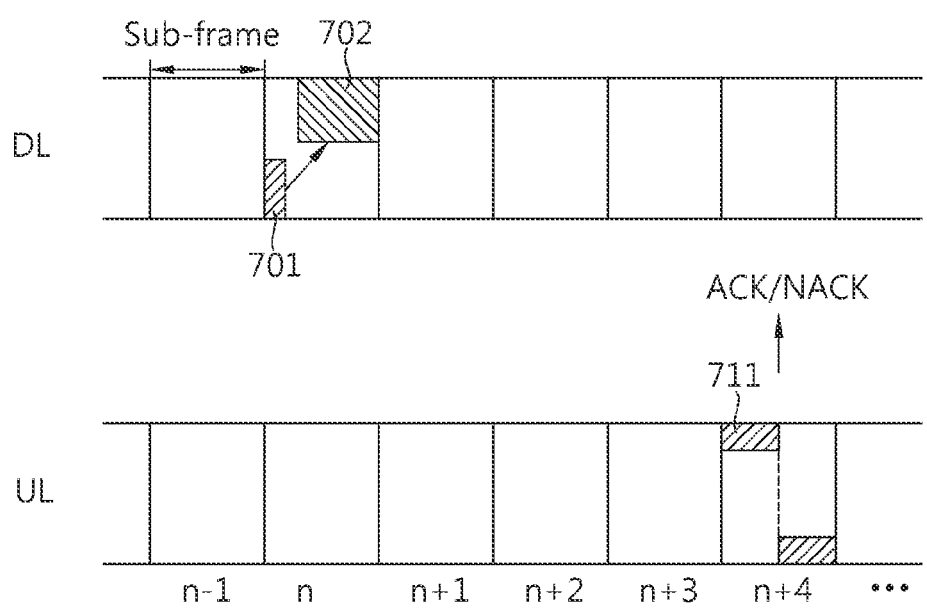
FIG. 7 illustrates an example of performing an HARQ.

FIG. 7 illustrates an example of performing an HARQ.

The UE monitors PDCCHs and receives a DL grant including a DL resource allocation on a PDCCH 701 in an nth DL sub-frame. The UE receives a DL transport block through a PDSCH 702 indicated by the DL resource allocation.

The UE transmits an ACK/NACK response to the DL transport block on a PUCCH 711 in an n+4th UL sub-frame. The ACK/NACK response may be an acknowledgement of reception of the DL transport block.

The ACK/NACK signal may be an ACK signal if the DL transport block is successfully decoded or an NACK signal if decoding of the DL transport block fails. The base station, when receiving the NACK signal, may perform re-transmission of a DL transport block until the base station receives an ACK signal or until the transmission reaches a maximum re-transmission count.

In 3GPP LTE, the UE utilizes a resource allocation of the PDCCH 701 in order to configure a resource index for the PUCCH 711. That is, the lowest CCE index (or the index of the first CCE) used for transmission of the PDCCH 701 is $n_{CCE}$, and a resource index is determined as $n_{PUCCH}^{(1)}=n_{CCE}+N_{PUCCH}^{(1)}$.

Now described is a multi-carrier system.

3GPP LTE systems are supportive of configurations in which a downlink bandwidth is different from an uplink bandwidth, which, however, assumes a single component carrier. 3GPP LTE systems may support up to 20 MHz with different bandwidths between uplink and downlink, and the systems are supportive of only one CC for each of uplink and downlink.

Spectrum aggregation (or bandwidth aggregation or carrier aggregation) supports multiple CCs. For example, allocation of five CCs each with a carrier bandwidth granularity of 20 MHz would support a bandwidth up to 100 MHz.

One DL CC (or a pair of downlink CC and uplink CC) may correspond to one cell. Accordingly, a UE communicating with a base station through a plurality of DL CCs may be said to be served from a plurality of serving cells.

LTE-A systems are looking to transmit, through a specific UL (uplink) CC (component carrier), a plurality of ACK/NACK information/signals for a plurality of PDSCHs transmitted through a plurality of DL (downlink) CCs (component carriers). To that end, one idea is, unlike in existing LTE systems in which ACKs/NACKs are transmitted using PUCCH format 1a/1b, to perform channel coding (e.g., Reed-Muller coding or Tail-biting convolutional coding) on a plurality of ACK/NACK information/signals and transmit the plurality of ACK/NACK information/signals using a new PUCCH format (e.g., an E-PUCCH format), a variation PUCCH format based on block-spreading as follows or PUCCH format 2. Now described is a block spreading-based, brand-new PUCCH format variant.

Figure 8:
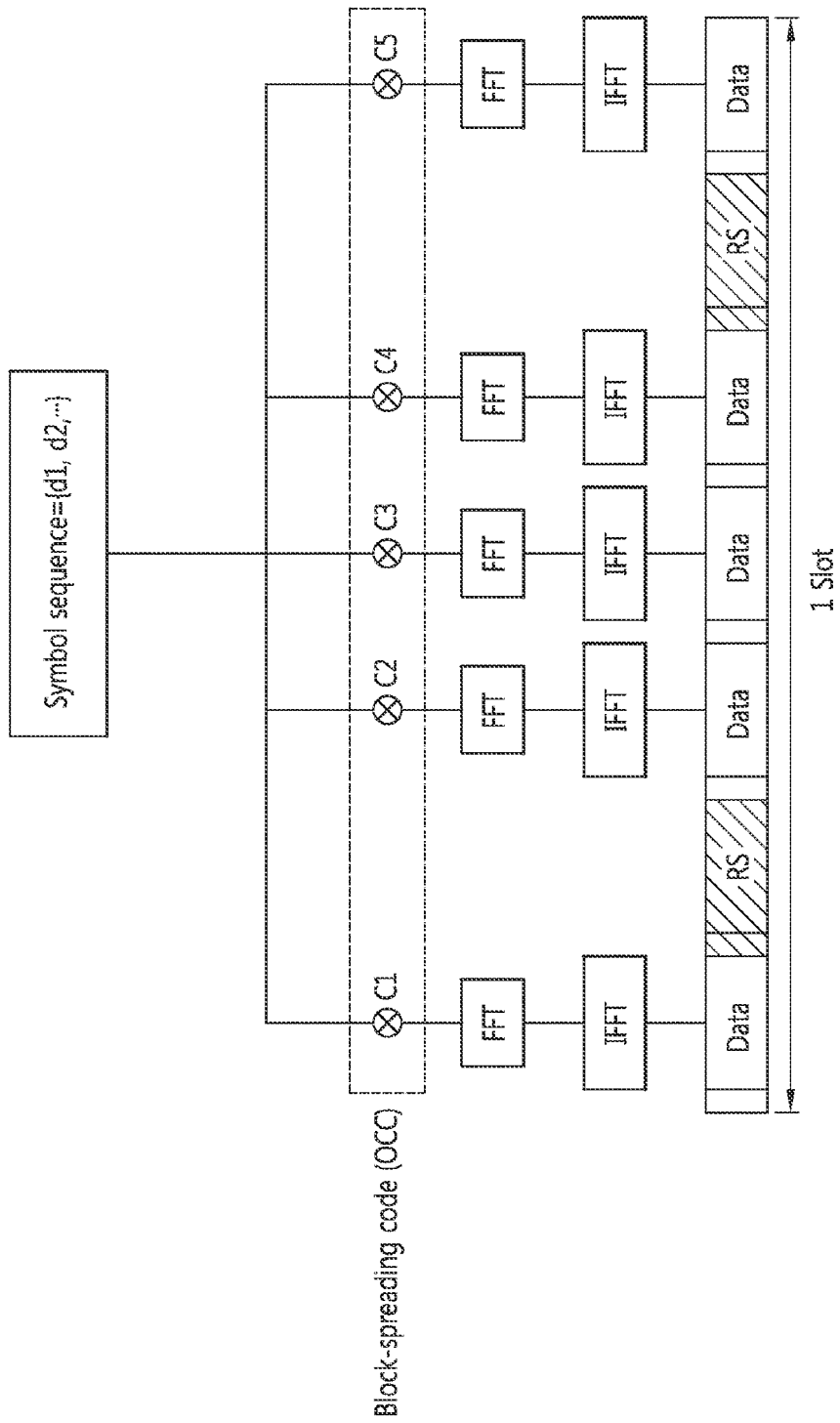
FIG. 8 illustrates a block spreading-based PUCCH format.

FIG. 8 illustrates a block spreading-based PUCCH format.

Block-spreading is a scheme to modulate control information (e.g., ACKs/NACKs) using an SC-FDMA scheme in transmitting the control information unlike that adopted for PUCCH format 1 or PUCCH format 2 in existing LTE systems.

Referring to FIG. 8, a symbol sequence may be spread by an OCC (Orthogonal Cover Code) in the time domain and may be transmitted. Control signals from a number of UEs may be multiplexed in the same RB using the OCC. In existing PUCCH format 2, one symbol sequence is transmitted over the time domain, and multiplexing on a UE is carried out using cyclic shifts of a CAZAC sequence. In the block spreading-based E-PUCCH, however, one symbol sequence is transmitted over the frequency domain, and multiplexing on a UE may be performed using OCC-based time domain spreading.

FIG. 8 illustrates an example in which one symbol sequence is generated into five SC-FDMA symbols through an OCC with length-5 (SF=5) and is then transmitted. Although in FIG. 8 a total of two RS symbols are used during one slot, three RS symbols or an OCC with SF=4 may be used or other various applications may be taken into account. Here, the RS symbols may be generated by a CAZAC sequence having a particular cyclic shift, and the RS symbols may be transmitted, applied (multiplied) with a particular OCC in the time domain.

For ease of description, the channel coding-based scheme for transmitting a plurality of ACKs/NACKs using PUCCH format 2 or E-PUCCH format is denoted a "multi-bit ACK/NACK coding transmission scheme." Multi-bit ACK/NACK coding may be used for transmitting ACK/NACK-coded blocks that are generated by channel-coding ACK/NACK or DTX information (which means failure to receive/detect a PDCCH) for PDSCHs of a plurality of DL CCs.

For example, if a UE operates in SU-MIMO mode to receive two codewords from a downlink CC, the UE may transmit information on a total of four feedback states including ACK/ACK, ACK/NACK, NACK/ACK, and NACK/NACK for each codeword or information on a total of five feedback states further including DTX. If the UE receives a single codeword, the UE may have information on a total of three feedback states including ACK, NACK, and DTX. If NACK and DTX are processed in the same way, the UE may have information on a total of two feedback states including ACK and NACK/DTX. If the UE aggregates up to five downlink CCs and operate in SU-MIMO mode on all the CCs, the UE may have information on a maximum of 55 transmissible feedback states. The size of ACK/NACK payload to represent the information on the 55 transmissible feedback states may be 12 bits in total. If DTX and NACK are processed in the same manner, the number of feedback states is 45, leaving the size of ACK/NACK payload being 10 bits to represent the feedback states.

The ACK/NACK multiplexing (e.g., ACK/NACK selection) method in existing LTE TDD systems basically takes into account an implicit ACK/NACK selection scheme that uses each UE's implicit PUCCH resources corresponding to PDCCHs scheduling PDSCHs in order to secure the UE's PUCCH resources. For example, implicit ACK/NACK selection may be conducted using implicit PUCCH resources linked with the lowest CCE index.

Meanwhile, LTE-A FDD systems are fundamentally looking to transmission of multiple ACKs/NACKs via a single particular uplink CC, which is UE-specifically configured, in response to multiple PDSCHs transmitted through a plurality of downlink CCs. For the purpose, consideration is given to an ACK/NACK selection scheme that utilizes implicit PUCCH resources linked with PDCCHs scheduling a particular one or some or all of the downlink CCs or a combination of the implicit PUCCH resources and explicit PUCCH resources previously reserved for each UE through RRC signaling. For instance, an ACK/NACK may be transmitted using an implicit PUCCH linked with the lowest CCE index nCCE or linked with nCCE and nCCE+1.

Figure 9:
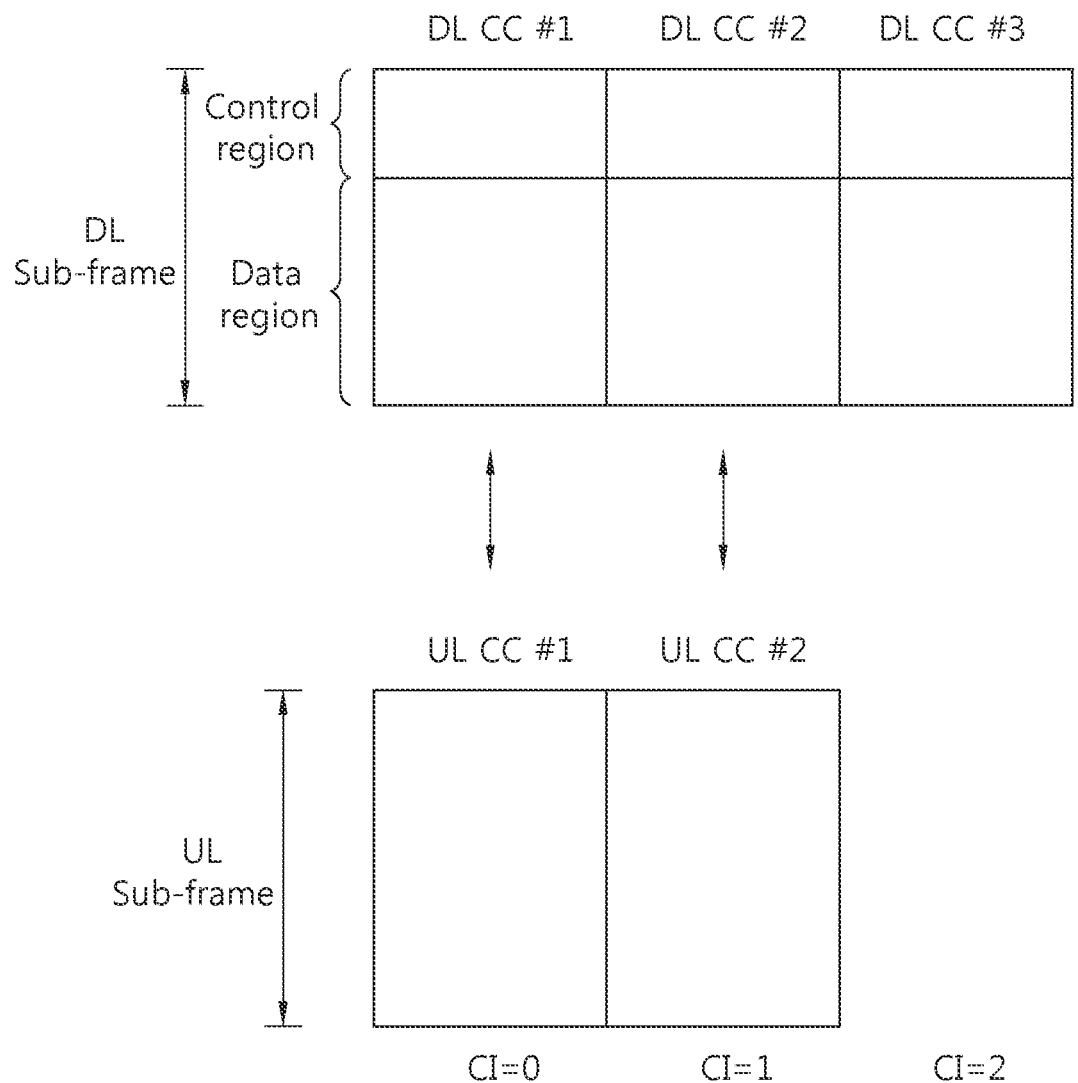
FIG. 9 illustrates an example multi-carrier.

FIG. 9 illustrates an exemplary multi-carrier.

Three DL CCs and three UL CCs are shown, but the number of DL CCs and UL CCs is not limited. A PDCCH and a PDSCH are independently transmitted on each DL CC, and a PUCCH and a PUSCH are independently transmitted on each UL CC. Since three DL CC-UL CC pairs are defined, a UE may be considered to be served from three serving cells.

The UE may monitor the DL CCs and the PDCCHs and the UE may receive DL transport blocks through the plurality of DL CCs. The UE may simultaneously transmit a plurality of UL transport blocks through the plurality of UL CCs.

Assume that a pair of DL CC #1 and UL CC #1 is a first serving cell, a pair of DL CC #2 and UL CC #2 a second serving cell, and DL CC #3 a third serving cell. Each serving cell may be identified through its cell index (CI). The CI may be unique to its corresponding cell or may be UE-specific. In this example, the first to third serving cells are assigned CI=0, 1, and 2.

The serving cells may be divided into a primary cell and secondary cells. The primary cell is a cell that operates at a primary frequency and that establishes the UE's initial connection or initiates a connection reestablishment process or is indicated during a handover process. The primary cell is also denoted a reference cell. Each secondary cell may operate at a secondary frequency and may be configured after an RRC connection has been established. The secondary cells may be used to provide additional radio resources. At least one primary cell is always configured, and secondary cell(s) may be added/modified/released by higher layer signaling. Each secondary cell may be activated by the primary cell.

The CI of the primary cell may be fixed. For example, the lowest CI may be designated as the CI of the primary cell. Hereinafter, the CI of the primary cell is 0, and the CIs of the secondary cells are sequentially assigned 1 and subsequent numbers, for the purpose of description.

Now ACK/NACK transmission for HARQ in 3GPP LTE TDD (Time Division Duplex) is described.

In TDD, unlike FDD (Frequency Division Duplex), DL sub-frames and UL sub-frames coexist in one radio frame. Typically, the number of UL sub-frames is smaller than the number of DL sub-frames. Accordingly, TDD systems back up transmission of a plurality of ACK/NACK signals in one UL sub-frame in response to a plurality of DL transport blocks in preparation for when UL sub-frames for transmitting ACK/NACK signals are insufficient.

Pursuant to 3GPP TS 36.213 V8.7.0 (2009 May), Ch. 10.1, two ACK/NACK modes, channel selection and bundling, are initiated.

First, in the bundling mode, the UE transmits an ACK when successfully decoding all received PDSCHs (i.e., downlink transport blocks), and otherwise, an NACK. This is denoted an AND operation.

However, bundling is not limited to the AND operation, and may rather include various other operations such as compression of ACK/NACK bits corresponding to the plurality of transport blocks (or codewords). For example, bundling may enable indication of the number of ACKs (or NACKs) counted or the number of consecutive ACKs.

Second, channel selection is also referred to as ACK/NACK multiplexing. The UE selects one of a plurality of PUCCH resources to transmit an ACK/NACK.

The following table shows DL sub-frame n-k associated with UL sub-frame n as per UL-DL configurations, where k∈K and M is the number of sets K.

Consider M DL sub-frames are associated in UL sub-frame n and M=4. Since the UE may receive four PDCCHs from four DL sub-frames, the UE may obtain three PUCCH resources ($n_{PUCCH,0}^{(1)}$, $n_{PUCCH,1}^{(1)}$, $n_{PUCCH,2}^{(1)}$, $n_{PUCCH,3}^{(1)}$) When b(0) and b(1) are encoded two-bit ACKs/NACKs, examples of channel selection are as shown in the following table

TABLE 6

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

HARQ-ACK(i) is an ACK/NACK for an ith downlink sub-frame among M downlink sub-frames. DTX (Discontinuous Transmission) means that the UE cannot receive a DL transport block on the PDSCH in the DL sub-frame or cannot detect a corresponding PDCCH.

For example, when the UE successfully receives all of the four DL transport blocks in the four DL sub-frames, the UE QPSK-modulates bit (1,1) using $n_{PUCCH,1}^{(1)}$ and transmits an ACK/NACK using PUCCH format 1b in response. If the UE fails to decode the DL transport block in the first (i=1_DL sub-frame and succeeds in decoding on the others, the UE QPSK-modulates bit (0,1) using $n_{PUCCH,3}^{(1)}$ and in response transmits an ACK/NACK using PUCCH format 1b.

Existing PUCCH format 1b may transmit two-bit ACKs/NACKs only. However, channel selection may transmit information on more ACK/NACK states by linking allocated PUCCH resources with actual ACK/NACK signals. Such PUCCH format may be called PUCCH format 1b with channel selection.

Meanwhile, when M DL sub-frames are associated with UL sub-frame n, an ACK/NACK mismatch between base station and UE may occur due to a missing DL sub-frame (or PDCCH).

TABLE 5

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Assume that M=4 and that the base station transmits four DL transport blocks through four DL sub-frames. The UE may receive only the first, third, and fourth transport blocks, but not the second transport block, due to the missing PDCCH in the second DL sub-frame. In this case, if bundling comes in use, the UE causes an error of transmitting an ACK.

To address such error, a DAI (Downlink Assignment Index) is included in the DL grant on each PDCCH. The DAI indicates the number of accumulative PDCCHs with assigned PDSCH transmission. A two-bit DAI value is sequentially increased from one, and from DAI=4, modulo-4 computation may apply back. If M=5, and five DL sub-frames are all scheduled, DAIs may be included in their corresponding PDCCHs in order of DAI=1, 2, 3, 4, and 1.

Figure 10:
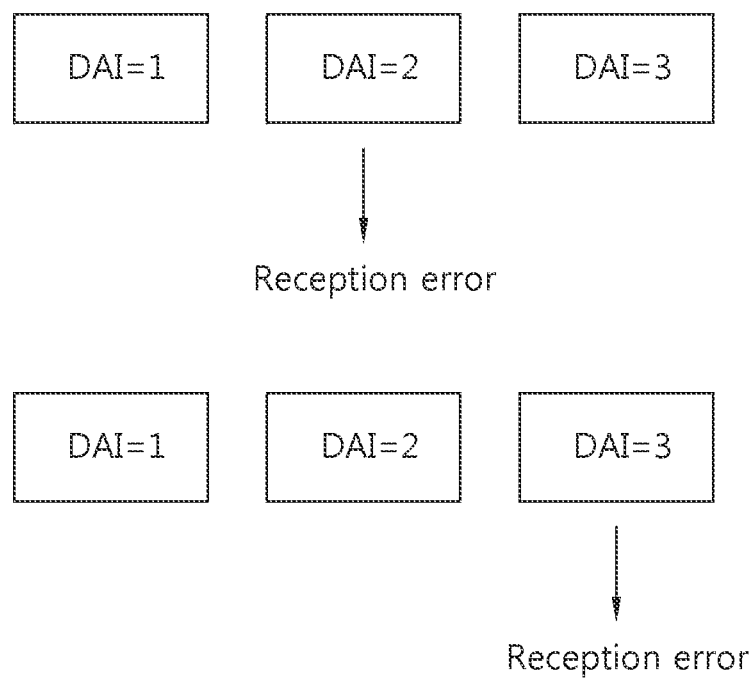
FIG. 10 illustrates examples of error detection using a DAI.

Considering a TDD configuration with DL:UL=9:1, modulo-4 computed DAI values may be given as follows:

DAI=1 for a first, fifth, or ninth scheduled PDSCH
DAI=2 for a second or sixth scheduled PDSCH
DAI=3 for a third or seventh scheduled PDSCH
DAI=4 for a fourth or eighth scheduled PDSCH FIG. 10 illustrates examples of error detection using a DAI.

At the upper portion of FIG. 9, the UE cannot receive DAI=2 due to the second DL sub-frame missing. In this case, the UE may be aware that the DL sub-frame corresponding to DAI=2 is missing as the UE receives DAI=3.

At the lower portion of FIG. 9, the UE cannot receive DAI=3 due to the third DL sub-frame missing. In this case, the UE might not be aware that the third DL sub-frame is missing. However, 3GPP LTE enables the base station to be aware of the missing DL sub-frame by configuring a PUCCH based on the first CCE in the last received PDCCH. In other words, the UE transmits an ACK/NACK using a PUCCH resource that is based on the PDCCH resource of the DL sub-frame corresponding to DAI=2. The base station receives the ACK/NACK using the PUCCH resource corresponding to the DL sub-frame with DAI=2, not the DL sub-frame with DAI=3, and the base station may thus be aware that the third DL sub-frame is missing.

Meanwhile, PUCCH format 3 is under discussion in addition to existing 3GPP LTE PUCCH formats in preparation for insufficient ACK/NACK bits due to use of a plurality of serving cells.

Figure 11:
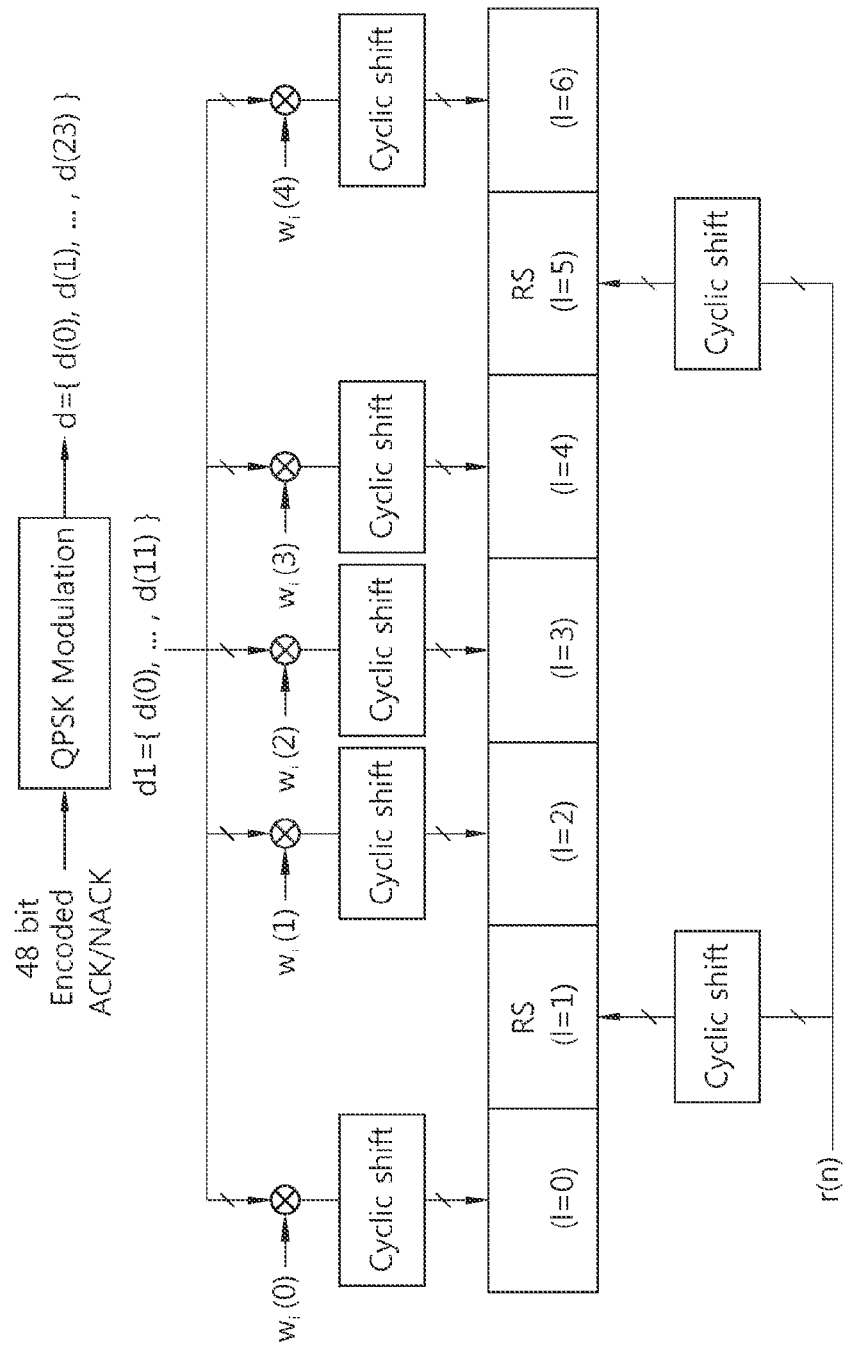
FIG. 11 is a view illustrating an exemplary structure of normal CP PUCCH format 3.

FIG. 11 is a view illustrating an exemplary structure of normal CP PUCCH format 3.

One slot includes seven OFDM symbols, and l has OFDM symbol numbers 0 to 6 in the slot. Two symbols with l=1, 5 are RS OFDM symbols for reference signals, and the other OFDM symbols are data OFDM symbols for ACK/NACK signals.

A 48-bit encoded ACK/NACK signal is subjected to QPSK (quadrature phase-shift keying) modulation to generate a symbol sequence d={d(0), d(1), . . . , d(23)}. d(n)(n=0, 1, . . . , 23) is a complex-valued modulated symbol. Symbol sequence d may be a set of modulated symbols. The number of bits in the ACK/NACK signal or the modulation scheme is a mere example, but is not limiting.

One PUCCH uses one RB, and one sub-frame includes a first slot and a second slot. Symbol sequence d={d(0), d(1), . . . , d(23)} is divided into two sequences each with a length of 12, i.e., d1={d(0), . . . , d(11)} and d2={d(12), . . . , d(23)}, and the first sequence d1 is transmitted in the first slot while the second sequence d2 is transmitted in the second slot. FIG. 5 shows an example in which the first sequence d1 is transmitted in the first slot.

The symbol sequence is spread with an orthogonal sequence $w_i$. The spread sequence corresponds to each OFDM symbol, and the orthogonal sequence is used to spread the symbol sequence over the data OFDM symbols to distinguish between PUCCHs (or UEs).

The orthogonal sequence comes with spread coefficient K=5 and includes five elements. The orthogonal sequence may be one of the five orthogonal sequences shown in the following Table 5 according to index i.

TABLE 7

| index i | [$w_i(0)$, $w_i(1)$, $w_i(2)$, $w_i(3)$, $w_i(4)$] |
| --- | --- |
| 0 | [1 1 1 1 1] |
| 1 | [1 $e^{j2\pi/5}$ $e^{j4\pi/5}$ $e^{j6\pi/5}$ $e^{j8\pi/5}$] |
| 2 | [1 $e^{j4\pi/5}$ $e^{j8\pi/5}$ $e^{j2\pi/5}$ $e^{j6\pi/5}$] |
| 3 | [1 $e^{j6\pi/5}$ $e^{j2\pi/5}$ $e^{j8\pi/5}$ $e^{j4\pi/5}$] |
| 4 | [1 $e^{j8\pi/5}$ $e^{j6\pi/5}$ $e^{j4\pi/5}$ $e^{j2\pi/5}$] |

The two slots in the sub-frame may use different orthogonal sequence indexes.

Each spread symbol sequence is cyclic shifted by a cell-specific cyclic shift value $n_{cs}^{cell}(n_s,1)$. Each cyclic shifted symbol sequence is mapped to its corresponding data OFDM symbol and is transmitted.

$n_{cs}^{cell}(n_s,1)$ is a cell-specific parameter determined by a pseudo-random sequence initialized based on a PCI (Physical Cell Identity). $n_{cs}^{cell}(n_s,1)$ varies depending on slot numbers $n_s$ in the radio frame and OFDM symbol numbers 1 in the slot.

Two RS OFDM symbols are transmitted, mapped with a reference signal sequence used for demodulation of an ACK/NACK signal.

As described supra, the ACK/NACK signal is spread with an orthogonal sequence with spread coefficient K=5, and thus, up to five UEs may be distinguished from each other with different orthogonal sequence indexes. This means that up to five PUCCH format 3's may be multiplexed in the same RB.

A resource index for PUCCH format 1a/1b is obtained from the latest received PDCCH resource. A resource index for PUCCH format 3 is indicated by an ARI (ACK/NACK resource indicator).

First, the base station informs the UE of a plurality of candidate resource indexes using a higher layer message such as an RRC message. The base station informs the UE of a resource index selected among the plurality of candidate resource indexes through a DL grant on the PDCCH. The field indicating the selected resource index in the DL grant is called an ARI.

For example, the base station informs the UE of four candidate resource indexes through an RRC message. The ARI on the PDCCH scheduling the PDSCH indicates one of the four candidate resource indexes, and a PUCCH format 3 is configured from the selected resource index.

To prevent the number of DL grant bits from increasing, the ARI may be transmitted using an existing DCI TPC (transmit power command).

An SPS (Semi-Persistent scheduling) is now described.

Typically, a UE first receives a DL grant from a PDCCH, then a transport block transmitted from a base station through a PDSCH indicated by the DL grant. This means every transport block comes with PDCCH monitoring, which is denoted dynamic scheduling. SPS previously defines a PDSCH resource, and the UE receives a transport block through the pre-defined resource without PDCCH monitoring.

Figure 12:
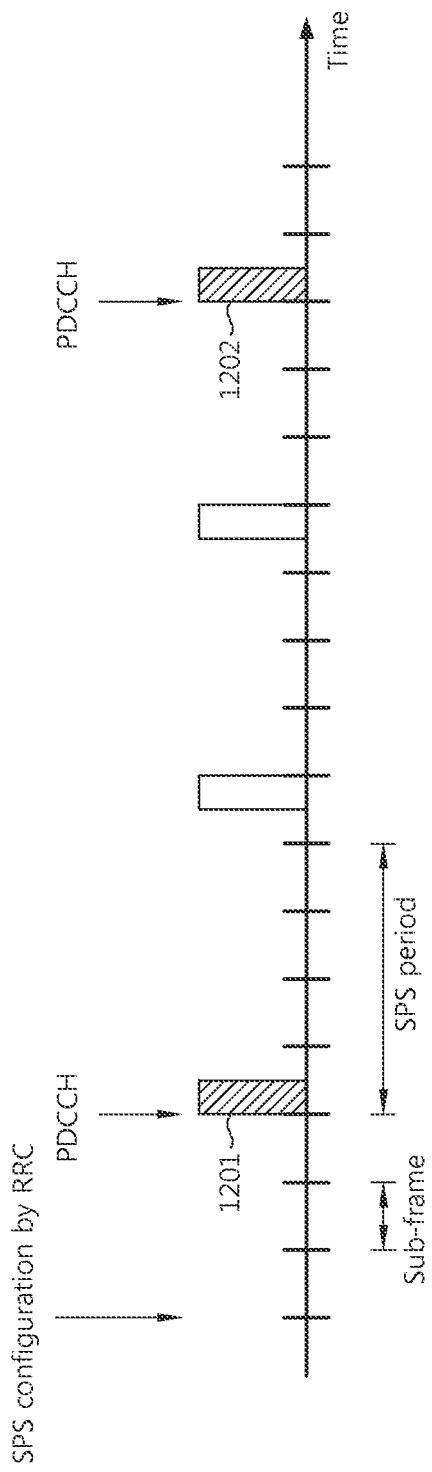
FIG. 12 illustrates an exemplary SPS in 3GPP LTE.

FIG. 12 illustrates an exemplary SPS in 3GPP LTE.

FIG. 12 illustrates DL SPS, but the same may also be applicable to UL SPS.

First, the base station sends an SPS configuration to the UE through an RRC (Radio Resource Control) message. The SPS configuration includes an SPS-C-RNTI and an SPS period. Here, the SPS period is assumed to be four subframes.

Although SPS is configured, SPS is not immediately carried out. The UE may monitor a PDCCH 1201 with a CRC masked with the SPS-C-RNTI to determine whether SPS is activated, and the UE may then receive downlink data based on SPS. When NDI included in the DCI on the PDCCH 1201 is 0, a combination of several fields included in the DCI (e.g., TPC (transmit power command), CS (Cyclic Shift) of DM-RS (demodulation reference signal), MCS (Modulation and Coding scheme), RV (redundancy version), HARQ process number, or resource allocation)) may be a basis for determining whether SPS is activated or deactivated. This is further described below in detail.

If SPS is activated, the UE may receive a transport block on the PDSCH at the SPS period even without receiving the DL grant on the PDCCH. The PDSCH received with no PDCCH is denoted an SPS PDSCH.

Thereafter, the UE monitors the PDCCH 1202 with the CRC masked with the SPS-C-RNTI to identify deactivation of SPS.

According to 3GPP LTE, the PDCCH indicating activation of SPS does not require an ACK/NACK response, but the PDCCH indicating deactivation of SPS needs an ACK/NACK response. Hereinafter, a DL transport block may contain a PDCCH indicating deactivation of SPS.

As per existing PUCCH format 1a/1b, a resource index $n^{(1)}_{PUCCH}$ is acquired from the PDCCH. According to SPS scheduling, however, no PDCCH associated with the PDSCH is received, and a pre-assigned resource index is thus put in use.

For SPS, the base station informs a plurality of candidate resource indexes to the UE through an RRC message. The base station notifies the UE of a resource index in use among the plurality of candidate resource indexes through the PDCCH 1201 activating SPS (hereinafter, "SPS PDCCH").

The UE may determine that the SPS PDCCH is valid only when meeting the following conditions.

1) When the CRC parity bit for PDCCH payload is scrambled with an SPS C-RNTI,

2) When NDI is set to 0. In the case of DCI formats 2, 2A, 2B, and 2C, the NDI field may reference one for possible transport blocks.

If all the fields for each DCI have been set as shown in Tables 8 and 9 below, validation may be obtained.

TABLE 9

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

In case the result of determination shows that the SPS PDCCH is validated, the UE may consider SPS activation or release based on the received DCI information.

Unless the activation is acquired, the received DCI format may be deemed, for the UE, a DCI format that has been received with a non-matching CRC.

In case the DCI format indicates downlink SPS activation, the TPC command for PUCCH field may be used to indicate the index for one of four PUCCH resource values set by a higher layer.

Table 10 shows PUCCH resources for downlink SPS.

TABLE 10

| Value of 'TPC command for PUCCH' | $n_{PUCCH}^{(1,p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

Now described is a downlink channel used in LTE systems, according to an embodiment of the present invention.

Figure 13:
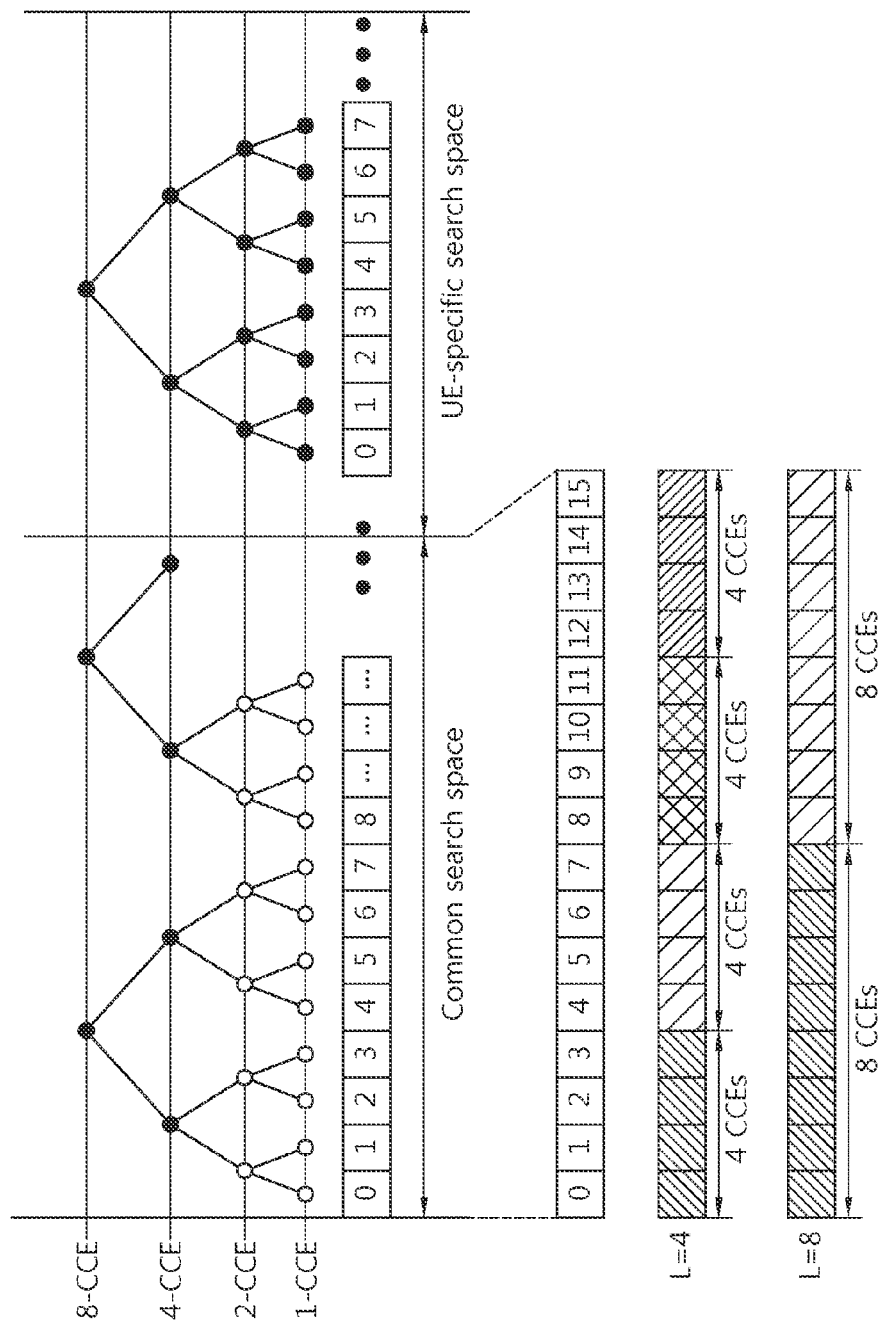
FIG. 13 is a view illustrating an example of PDCCH monitoring.

FIG. 13 is a view illustrating an example of monitoring PDCCH.

For a PDCCH monitoring procedure, refer to 3GPP TS 36.213 V10.2.0 (2011-06), Ch. 9.

A UE can perform blind decoding for detecting the PDCCH. Blind decoding is a scheme in which a desired identifier is demasked to the CRC of a received PDCCH

TABLE 8

|  | DCI format 0 | DCI format 1/1A | DCI format 2/2A/2B/2C |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

(referred to as a candidate PDCCH) and CRC error check is conducted so as to identify whether the corresponding PDCCH is its own control channel. The terminal is not aware of CCE aggregation level or DCI format for transmission and a position at which its PDCCH data is transmitted in a control region.

A plurality of PDCCHs may be transmitted in one sub-frame. The UE monitors a plurality of PDCCHs at every sub-frame. Here, the term "monitoring" refers to the UE attempting to perform blind decoding on a PDCCH.

In 3GPP LTE, the UE uses a search space for reducing load caused by blind decoding. The search space may be regarded as CCEs' monitoring set for searching a PDCCH. The UE monitors the PDCCH based on the search space.

The search space is divided into a common search space and a UE-specific search space. The common search space is a space for searching a PDCCH having common control information and consists of 16 CCEs, CCE index 0 to 15, and supports PDCCHs having a CCE aggregation level of {4, 8}. However, a PDCCH (DCI formats 0 and 1A) for carrying UE-specific information may be transmitted even in the common search space. The UE-specific search space supports PDCCHs having a CCE aggregation level of {1, 2, 4, 8}.

The following table shows the number of PDCCH candidates that are monitored by the UE.

TABLE 11

| Type | Search space $S_k^{(L)}$ | | Number of PDCCH candidates $M^{(L)}$ | DCI Format |
|---|---|---|---|---|
| | Aggregation level L | Size [in CCEs] | | |
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

The size of a search space is determined according to Table 11 above, and the start point of a search space is defined differently for each of the common search space and UE-specific search space. The start point of the common search space is fixed regardless of any sub-frame, but the start point of the UE-specific search space may vary per sub-frame depending on the UE identifier (e.g., C-RNTI), CCE aggregation level and/or slot number in a radio frame. In case the start point of the UE-specific search space is positioned in the common search space, the UE-specific search space and the common search space may overlap.

An aggregation of PDCCH candidates monitored by the UE may be defined on the basis of a search space. In an aggregation level 1, 2, 4 or 8, search space $s_k^{(L)}$ is defined as a set of PDCCH candidates. The CCE corresponding to PDCCH candidate m in search space $S_k^{(L)}$ is given as follows:

$$L\{(Y_k+m') \bmod \lfloor N_{CCE,k}/L \rfloor\}+i \qquad \text{Equation 1}$$

Here, i=0, ... L-1, and in case the search space is the common search space, m'=m. In case the search space is a specific search space, and a carrier indicator field(CIF) is configured to the UE, m'=m+$m^{(L)} \cdot n_{CI}$, $n_{CI}$ is a value of the configured CIF. If the CIF is not configured to the UE, m'=m. Here, it is m=0, ..., $M^{(L)}$−1 and $M^{(L)}$ is the number of the PDCCH candidates for monitoring the given search space.

In the common search space, $Y_k$ is set as 0 for two aggregation levels, L=4 and L=8. In the UE-specific search space of aggregation level L, variable $Y_k$ is defined as follows:

$$Y_k=(A \cdot Y_{k-1}) \bmod D \qquad \text{Equation 2}$$

Here, $Y_{-1}=n_{RNTI} \neq 0$, A=39827, D=65537, k=$\lfloor n_s/2 \rfloor$, and $n_s$ is a slot number in a radio frame.

When a wireless device monitors the PDCCH based on the C-RNTI, a DCI format, and a search space are determined according to a PDSCH transmission mode. Table 12 below shows an example of monitoring PDCCH in which the C-RNTI is configured.

TABLE 12

| Transmission mode | DCI format | Search Space | Transmission mode of PDSCH corresponding to PDCCH |
|---|---|---|---|
| Mode 1 | DCI format 1A | Common and UE specific | Single-antenna port, port 0 |
| | DCI format 1 | UE specific | Single-antenna port, port 0 |
| Mode 2 | DCI format 1A | Common and UE specific | Transmit diversity |
| | DCI format 1 | UE specific | Transmit diversity |
| Mode 3 | DCI format 1A | Common and UE specific | Transmit diversity |
| | DCI format 2A | UE specific | Cyclic Delay Diversity(CDD) or Transmit diversity |
| Mode 4 | DCI format 1A | Common and UE specific | Transmit diversity |
| | DCI format 2 | UE specific | Closed-loop spatial multiplexing |
| Mode 5 | DCI format 1A | Common and UE specific | Transmit diversity |
| | DCI format 1D | UE specific | Multi-user Multiple Input Multiple Output(MU-MIMO) |
| Mode 6 | DCI format 1A | Common and UE specific | Transmit diversity |
| | DCI format 1B | UE specific | Closed-loop spatial multiplexing |
| Mode 7 | DCI format 1A | Common and UE specific | If the number of PBCH transmit ports is one, single-antenna port, port 0 is used, otherwise Transmit diversity |
| | DCI format 1 | UE specific | Single-antenna port, port 5 |
| Mode 8 | DCI format 1A | Common and UE specific | If the number of PBCH transmit ports is one, single-antenna port, port 0 is used, otherwise Transmit diversity |
| | DCI format 2B | UE specific | Dual layer transmit, port 7 or 8 or single-antenna port, port 7 or 8 |

Uses of DCI formats can be classified as shown in the following table.

TABLE 13

| DCI format | Description |
|---|---|
| DCI format 0 | used for the scheduling of PUSCH |
| DCI format 1 | used for the scheduling of PDSCH codeword |
| DCI format 1A | used for the compact scheduling of one PDSCH codeword and random access procedure |
| DCI format 1B | used for the compact scheduling of one PDSCH codeword with precoding information |
| DCI format 1C | used for the compact scheduling of one PDSCH codeword |

TABLE 13-continued

| DCI format | Description |
|---|---|
| DCI format 1D | used for the compact scheduling of one PDSCH codeword with precoding and power offset information |
| DCI format 2 | used for the scheduling PDSCH to UEs configured in closed-loop spatial multiplexing mode |
| DCI format 2A | used for the scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustment |

DCI formats and search spaces to be used may be differently determined depending on RNTI masked to CRC which has been used for generating DCI. Table 14 below represents DCI formats and search spaces of a control channel in case that SI-RNTI, P-RNTI or RA-RNTI is masked to the CRC of the DCI.

TABLE 14

| DCI format | Search space | Transmission mode of PDSCH corresponding to PDCCH |
|---|---|---|
| DCI format 1C | Common | If the number of PBCH transmit ports is one, single-antenna port, port 0 is used, otherwise Transmit diversity |
| DCI format 1A | Common | If the number of PBCH transmit ports is one, single-antenna port, port 0 is used, otherwise Transmit diversity |

Table 15 below shows DCI formats and search spaces of a control channel in case that SPS-C-RNT is masked to the CRC of the DCI

TABLE 15

| Transmission mode | DCI format | Search space | Transmission mode of PDSCH corresponding to PDCCH |
|---|---|---|---|
| Mode 1 | DCI format 1A | Common and UE specific | Single antenna port, port 0 |
| | DCI format 1 | UE specific | Single antenna port, port 0 |
| Mode 2 | DCI format 1A | Common and UE specific | Transmit diversity |
| | DCI format 1 | UE specific | Transmit diversity |
| Mode 3 | DCI format 1A | Common and UE specific | Transmit diversity |
| | DCI format 2A | UE specific | Transmit diversity |
| Mode 4 | DCI format 1A | Common and UE specific | Transmit diversity |
| | DCI format 2 | UE specific | Transmit diversity |
| Mode 5 | DCI format 1A | Common and UE specific | Transmit diversity |
| Mode 6 | DCI format 1A | Common and UE specific | Transmit diversity |
| Mode 7 | DCI format 1A | Common and UE specific | Single antenna port 5 |
| | DCI format 1 | UE specific | Single antenna port 5 |
| Mode 8 | DCI format 1A | Common and UE specific | Single antenna port 7 |
| | DCI format 2B | UE specific | Single antenna port 7 or 8 |
| Mode 9 | DCI format 1A | Common and UE specific | Single antenna port 7 |
| | DCI format 2C | UE specific | Single antenna port 7 or 8 |
| Mode 10 | DCI format 1A | Common and UE specific | Single antenna port 7 |
| | DCI format 2D | UE specific | Single antenna port 7 or 8 |

Table 16 below shows search spaces and DCI formats used in case that temporary C-RNTI is masked to the CRC of the DCI.

TABLE 16

| DCI format | Search space | Transmission mode of PDSCH corresponding to PDCCH |
|---|---|---|
| DCI format 1A | Common and UE specific | If the number of PBCH transmit ports is one, single-antenna port, port 0 |

TABLE 16-continued

| DCI format | Search space | Transmission mode of PDSCH corresponding to PDCCH |
|---|---|---|
| | | is used, otherwise Transmit diversity |
| DCI format 1 | Common and UE specific | If the number of PBCH transmit ports is one, single-antenna port, port 0 is used, otherwise Transmit diversity |

Figure 14:
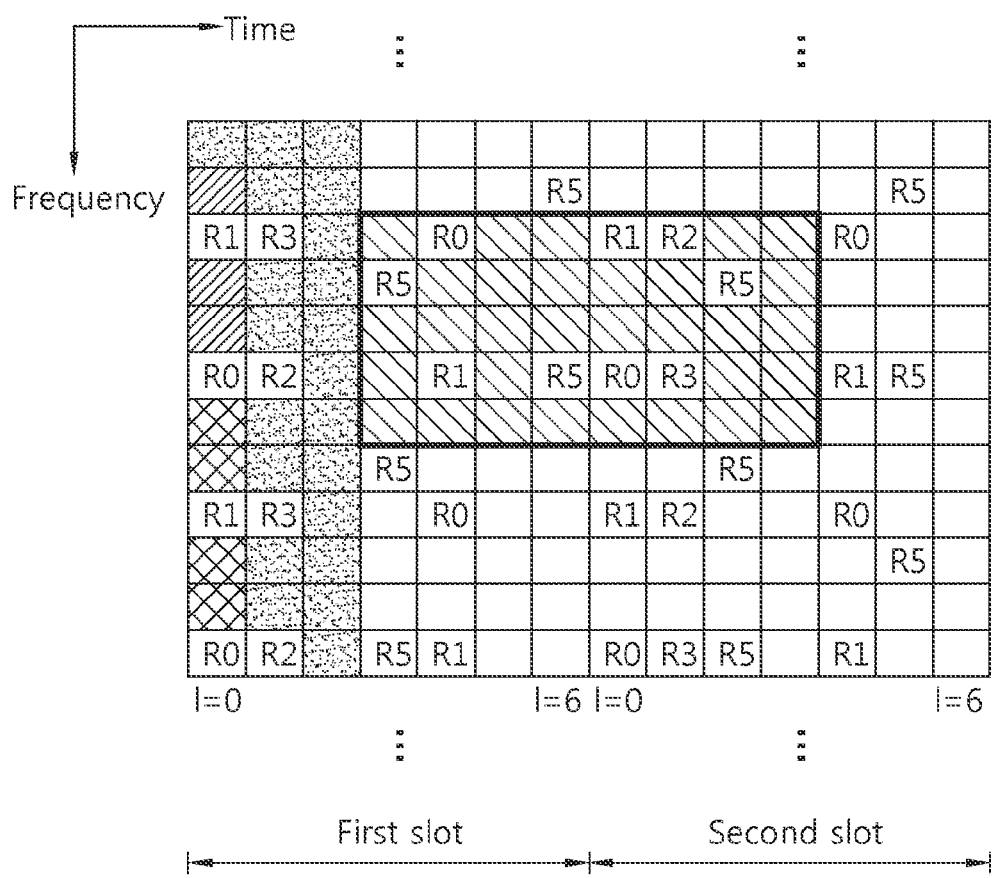
FIG. 14 illustrates a downlink sub-frame allocated with a control channel and a 3GPP LTE reference signal.

FIG. 14 shows an example of a downlink subframe in which a reference signal and a control channel in 3GPP LTE are allocated.

A downlink subframe may be classified into a control region and a data region. For example, in the downlink subframe, the control region (or a PDCCH region) includes front three OFDM symbols and the data region in which a PDSCH is transmitted includes remaining OFDM symbols.

In the control region, a PCFICH, a PHICH and/or the PDCCH are transmitted.

The physical HARQ ACK/NACK indicator channel (PHICH) may transmit a hybrid automatic retransmission request (HARQ) information as a response to a uplink transmission.

The physical control format indicator channel (PCFICH) may transmit the information of the number of OFDM symbols allocated to the PDCCH. For example, a control format indicator (CFI) of the PCFICH may indicate three OFDM symbols. The region excluding the resource through which the PCFICH and/or the PHICH is transmitted is the PDCCH region that a wireless device monitors the PDCCH.

In the subframe, various reference signals may be transmitted as well.

Acell-specific reference signal reference signal (CRS) is a reference signal that all wireless devices in a cell may receive, and may be transmitted over the whole downlink frequency band. In FIG. 6, 'R0' denotes an RE (resource element) where a CRS for a first antenna port is transmitted, 'R1' which is an RE where a CRS for a second antenna port is transmitted, 'R2' which is an RE where a CRS for a third antenna port is transmitted, and 'R3' which is an RE where a CRS for a fourth antenna port is transmitted.

The RS sequence $r_{l,n_s}(m)$ for CRS is defined as follows.

$$r_{l,n_s}(m) = \frac{1}{\sqrt{2}}(1-2\cdot c(2m)) + j\frac{1}{\sqrt{2}}(1-2\cdot c(2m+1)) \quad \langle\text{Equation 3}\rangle$$

Herein, m=0, 1, . . . , $2N_{RB}^{max,DL}-1$, $N_{RB}^{max,DL}$ is the maximum number of RBs, ns is a slot number in a radio frame, and 1 is an OFDM symbol index in a slot.

A pseudo-random sequence, c(i), is defined by a gold sequence whose length is 31, as follows.

$c(n)=(x_1(n+N_C)+x_2(n+N_C)) \bmod 2$ $x_1(n+31)=(x_1(n+3)+x_1(n)) \bmod 2$ $x_2(n+31)=(x_2(n+3)+x_2(n+2)+x_2(n+1)+x_2(n)) \bmod 2$ <Equation 4>

Herein, Nc=1600, and the first m-sequence is initialized as x1(0)=1, x1(n)=0, m=1, 2, . . . , 30. The second m-sequence is initialized as $c_{init}=2^{10}\cdot(7\cdot(n_s+1)+l+1)\cdot(2\cdot N_{ID}^{cell}+1)+2\cdot N_{ID}^{cell}+N_{CP}$ at the beginning of each OFDM symbol. $N_{ID}^{cell}$ is a physical cell identity (PCI) of the cell, and $N_{CP}$=1 in case of the normal CP, and $N_{CP}$=0 in case of the extended CP.

Also, aUE-specific reference signal (URS) may be transmitted in a subframe. Although the CRS is transmitted in the entire region of a subframe, the URS is transmitted in the data region of the sub-frame, and is a reference signal used for demodulatingthe PDSCH. In FIG. 7, 'R5' denotes an RE where the URS is transmitted. A DM-RS is a reference signal used for demodulating the EPDCCH data.

The URS may be transmitted in an RB in which the corresponding PDSCH data is mapped. Although in FIG. 7, R5 is denoted outside the area in which the PDSCH is transmitted, this is merely to indicate the position of the RE to which the URS is mapped.

The URS is may be a reference signal which is demodulated only by a specific wireless device. The RS sequence $r_{l,n_s}(m)$ for the URS is the same as Equation 3. At this time, m=0, 1, . . . , $12N_{RB}^{PDSCH}-1$ and $N_{RB}^{PDSCH}$ is the number of RBs which is used for the corresponding PDSCH transmission. In case that the URS is transmitted through a single antenna, the pseudo-random sequence generator is initialized as $c_{init}=(\lfloor(n_s/2\rfloor+1)\cdot(2N_{ID}^{cell}+1)\cdot 2^{16}+n_{RNTI}$ at the start of each subframe. $n_{RNTI}$ is an identifier of a wireless device.

The above-described initializing method is associated with the case where the URS is transmitted through a single antenna. When the URS is transmitted through a multi-antenna, the pseudo-random sequence generator is initialized as $c_{init}=(\lfloor n_s/2\rfloor+1)\cdot(2n_{ID}^{(nSCID)}+1)\cdot 2^{16}+n_{SCID}$ at the start of each sub-frame. $n_{SCID}$ is a parameter that is acquired from a DL grant (for example, DCI format 2B or 2C) related with PDSCH transmission.

The URS supports multiple input multiple output (MIMO) transmission. Depending on an antenna port or layer, the RS sequence for the URS may be spread to the spread sequence as follows.

TABLE 17

| Layer | [w(0), w(1), w(2), w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |

TABLE 17-continued

| Layer | [w(0), w(1), w(2), w(3)] |
|---|---|
| 6 | [−1 −1 +1 +1] |
| 7 | [+1 −1 −1 +1] |
| 8 | [−1 +1 +1 −1] |

A layer may be defined as an information path inputted to a pre coder. A rank is the number of non-zero eigenvalue in the MIMO channel matrix, and is the same as the number of layer or space stream. The layer may correspond to an antenna port that distinguishes the URS and/or a spread sequence which is applied to the URS.

Meanwhile, the PDCCH is monitored in a restricted region such as a control region in a subframe, and the CRS transmitted from whole bands is used for demodulating the PDCCH. As the sort of control data becomes diverse and an amount of the control data is increased, a flexibility of scheduling becomes deteriorated with the existing PDCCH only. Also, in order to decrease overhead owing to the CRS transmission, an enhanced PDCCH (EPDCCH) is introduced.

Figure 15:
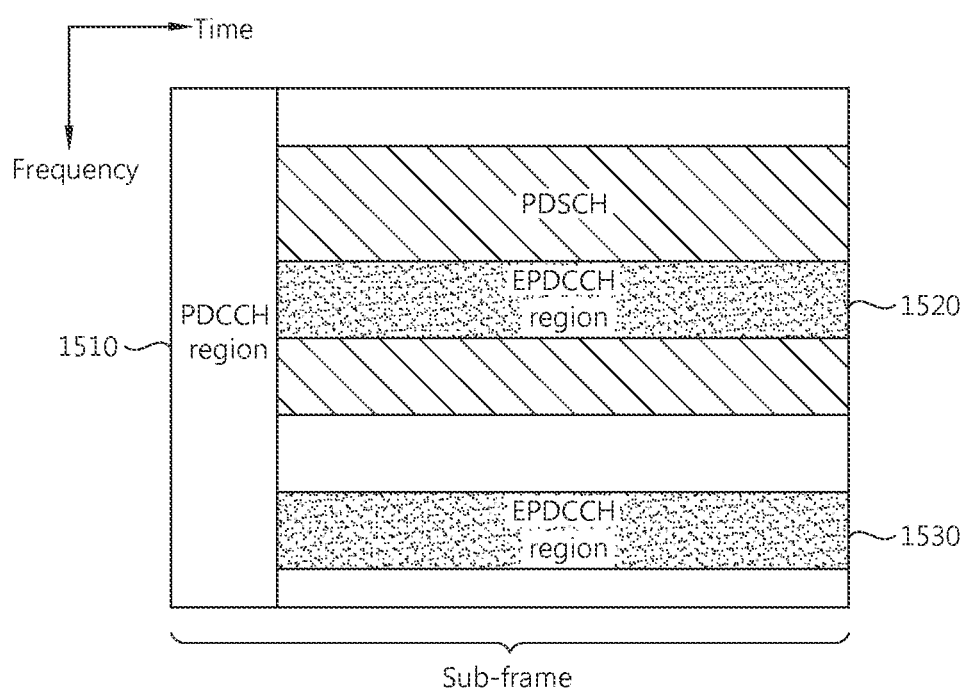
FIG. 15 illustrates an exemplary sub-frame having an ePDCCH.

FIG. 15 illustrates an exemplary sub-frame having an EPDCCH.

A sub-frame may include zero or one PDCCH region 1510 and zero or more ePDCCH regions 1520 and 1530.

The EPDCCH regions 1520 and 1530 are regions where the UE monitors epochs. The PDCCH region 1510 is positioned at first three or up to first four OFDM symbols in a sub-frame, and the EPDCCH regions 1520 and 1530 may be flexibly scheduled at OFDM symbols behind the PDCCH region 1510.

One or more EPDCCH regions 1520 and 1530 may be designated in the UE, and the UE may monitor EPDCCH data in the designated EPDCCH regions 1520 and 1530.

The number/position/size of the EPDCCH regions 1520 and 1530, and/or information regarding a sub-frame to monitor the EPDCCHs may be informed by the base station to the UE through, e.g., an RRC (radio resource control) message.

In the PDCCH region 1510, the PDCCH may be demodulated based on a CRS. In the EPDCCH regions 1520 and 1530, a DM-RS, not a CRS, may be defined for demodulation of the EPDCCHs. The DM-RS may be transmitted in its corresponding EPDCCH region 1520 and 1530.

An RS sequence for the DM-RS is the same as shown in Equation 3. In this case, m=0, 1, . . . , $12N_{RB}^{max,DL}-1$, $N_{RB}^{max,DL}$ is the maximum number of RBs. The pseudo-random sequence generator may be initialized as $c_{init}=(\lfloor n_s/2\rfloor+1)\cdot(2n_{ID}^{EPDCCH}+1)\cdot 2^{16}+n_{SCID}^{EPDCCH}$ at the start of each sub-frame. $n_s$ is a slot number in the radio frame, $n_{ID,i}^{EPDCCH}$ is a cell index related to a corresponding EPDCCH region, and $n_{SCID}^{EPDCCH}$ is a parameter given from a higher layer signaling.

Each EPDCCH region 1520 and 1530 may be used in scheduling for a different cell. For example, the EPDCCH in the EPDCCH region 1520 may carry scheduling information for a primary cell, and the EPDCCH in the EPDCCH region 1530 may carry scheduling information for a secondary cell.

When the EPDCCHs in the EPDCCH regions 1520 and 1530 are transmitted through multiple antennas, the DM-RSs in the EPDCCH regions 1520 and 1530 may be subjected to the same precoding as the EPDCCHs.

As compared with PDCCHs that adopt CCEs as their units for transmission, EPDCCHs use ECCEs (Enhanced Control Channel Elements) as their units for transmission.

Aggregation levels may be defined in units of resources to monitor EPDCCHs. For example, assuming that one ECCE is a minimum resource for an EPDCCH, aggregation levels L={1,2,4,8,16} may be defined. Also in the EPDCCH regions, search spaces may be defined. The UE may monitor EPDCCH candidates based on aggregation levels.

Figure 16:
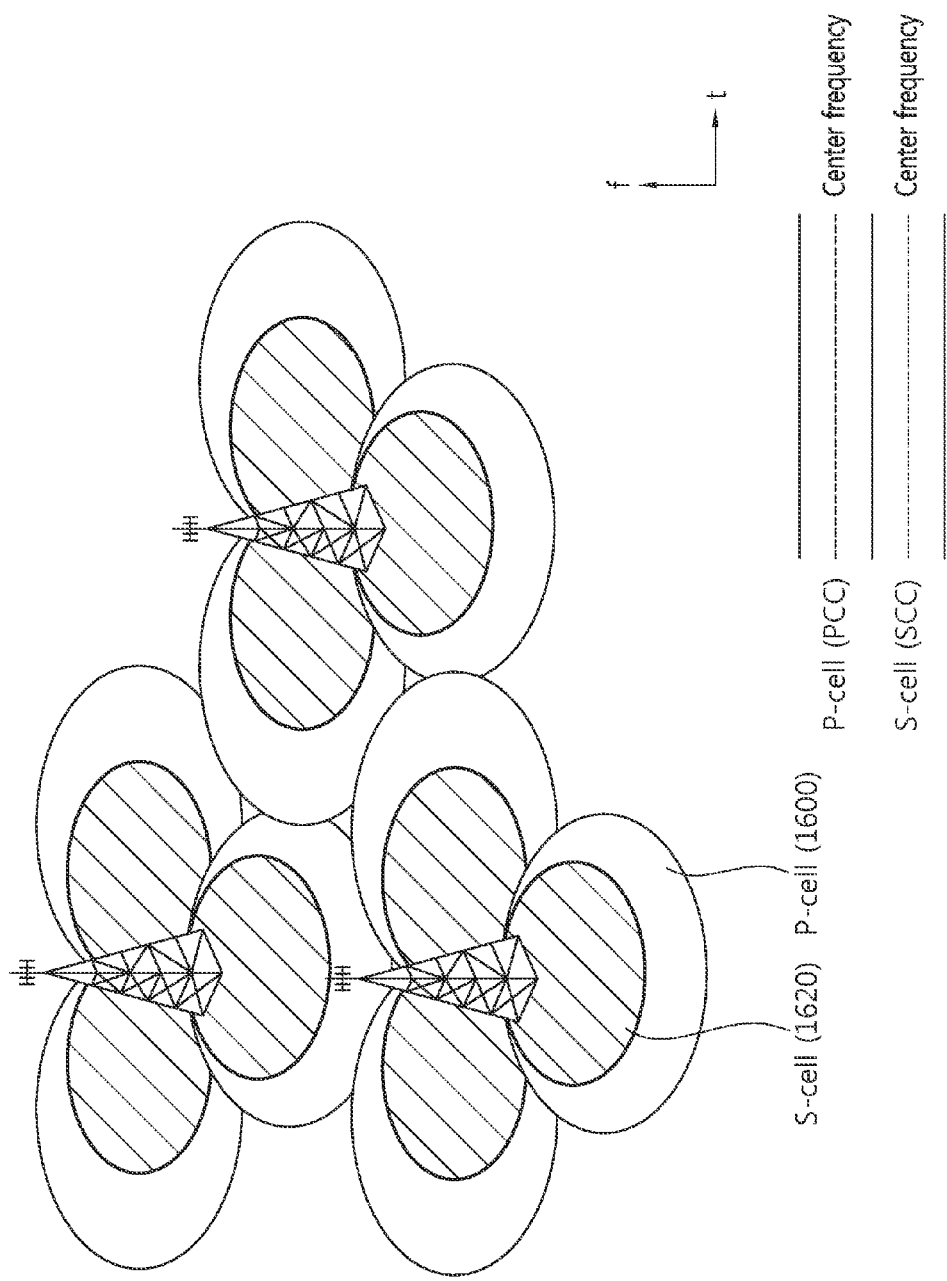
FIG. 16 is a concept view illustrating a P-cell and an S-cell.

FIG. 16 is a concept view illustrating a P-cell and an S-cell.

In FIG. 16, one of deployment scenarios of the P-cell and the S-cell is disclosed exemplarily. The P-cell and the S-cell may be configured in various ways. Each of the P-cell and the S-cell can include a different center frequency, Referring to FIG. 16, a base station can perform carrier aggregation based on PCC of the P-cell 1600 and one or more SCC of the S-cell 1620. When 2 cells or more exist, the base station can determine one cell as the P-cell 1600 and determine another cell as S-cell 1620. The base station may transmit data to a UE by using aggregated frequency bandwidth, after aggregating CC of the determined P-cell 1600 and S-cell 1620. The UE also can transmit data to the base station by using aggregated frequency bandwidth. The P-cell 1600 and S-cell 1620 of FIG. 15 is an example of a scenario where the P-cell 1600 and S-cell 1620 are arranged, where a transmission range of data on the basis of PCC is greater than that of data on the basis of SCC.

The UE can perform radio resource control (RRC) connection through the PCC. Furthermore, the UE can attempt random access to the base station through a physical random access channel (PRACH) based on a signal which is signaled through the PCC. That is, the UE can perform initial connection establishment or connection reestablishment process to the base station through the PCC in carrier aggregation environment.

The SCC of the S-cell 1620 may be used for providing additional radio resources. In order to perform carrier aggregation by which SCC is aggregated to PCC, the UE needs to perform neighbor cell measurement for acquiring information on the neighbor cells. The base station can determine whether to aggregate the SCC to the PCC according to the result of the neighbor cell measurement. For example, in the P-cell, a NCT subframe to be described may be transmitted via the SCC. The base station can transmit PDCCH data through the PCC to the UE. The PDCCH data may include information on allocation of PDSCH data to be transmitted via a downlink PCC bandwidth and SCC bandwidth, and information on approval of data transmission via an uplink.

The P-cell 1600 and the S-cell 1620 may perform carrier aggregation through configuration and activation and transmit and receive data through an aggregated frequency bandwidth.

The UE may be configured by a higher layer to semi-statically feedback a CSI (e.g., CQI (channel quality indicator), PMI (precoding matrix index), PTI (precoding type indicator) and/or RI (rank index)). Upon performing periodic CSI reporting, the UE may transmit the CSI to the base station based on a CSI reporting mode. The following Table 18 distinguishes between CSI reporting modes based on a PMI feedback type and a PUCCH CQI feedback type.

TABLE 18

| | | PMI Feedback Type | |
|---|---|---|---|
| | | No PMI | Single PMI |
| PUCCH CQI Feedback Type | Wideband (wideband CQI) | Mode 1-0 | Mode 1-1 |

TABLE 18-continued

| | | PMI Feedback Type | |
|---|---|---|---|
| | | No PMI | Single PMI |
| | UE Selected (subband CQI) | Mode 2-0 | Mode 2-1 |

Figure 18:
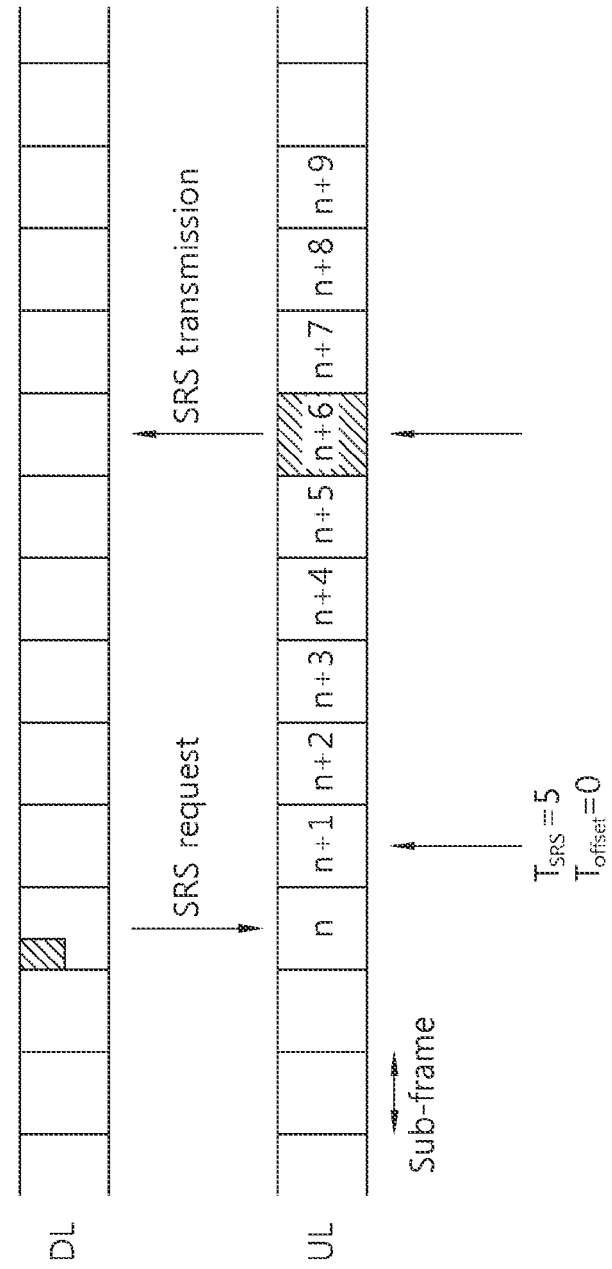
FIG. 18 illustrates an example of aperiodic SRS transmission.

Referring to FIG. 18, the CSI reporting modes may be divided into four different modes. Each CSI reporting mode may be identified according to whether a PMI is transmitted and whether the frequency band at which the CQI is transmitted is a wideband or a UE-selected subband. The CSI reporting modes used as per transmission modes may be as follows:

CSI Reporting Modes as Per Transmission Modes
Transmission mode 1: Modes 1-0, 2-0
Transmission mode 2: Modes 1-0, 2-0
Transmission mode 3: Modes 1-0, 2-0
Transmission mode 4: Modes 1-1, 2-1
Transmission mode 5: Modes 1-1, 2-1
Transmission mode 6: Modes 1-1, 2-1
Transmission mode 7: Modes 1-0, 2-0
Transmission mode 8: in case the UE is configured to do PMI/RI reporting, Modes 1-1, 2-1, and in case the UE is configured not to do PMI/RI reporting, Modes 1-0, 2-0.
Transmission mode 9: in case the UE is configured to do PMI/RI reporting and the number of CSI-RS ports is more than 1, Modes 1-1, 2-1, and in case the UE is configured not to do PMI/RI reporting or the number of CSI-RS ports is 1, Modes 1-0, 2-0.
Transmission mode 10: in case the UE is configured to do PMI/RI reporting and the number of CSI-RS ports is more than 1, Modes 1-1, 2-1, and in case the UE is configured not to do PMI/RI reporting and the number of CSI-RS ports is 1, Modes 1-0, 2-0.

The UE's transmission mode may be set as shown in Table 9 according to transmission methods of a PDSCH associated with a PDCCH.

TABLE 19

| Transmission mode | Transmission scheme of PDSCH corresponding to PDCCH |
|---|---|
| Mode 1 | Single-antenna port, port 0 |
| Mode 2 | Transmit diversity (see subclause 7.1.2) |
| Mode 3 | Large delay CDD or Transmit diversity |
| Mode 4 | Closed-loop spatial multiplexing or Transmit diversity |
| Mode 5 | Transmit diversity, Multi-user MIMO |
| Mode 6 | Transmit diversity, Closed-loop spatial multiplexing using a single transmission layer |
| Mode 7 | If the number of PBCH antenna ports is one, Single-antenna port, port 0 is used, otherwise Transmit diversity. Single-antenna port, port 5. |
| Mode 8 | If the number of PBCH antenna ports is one, Single-antenna port, port 0 is used, otherwise Transmit diversity Dual layer transmission, port 7 and 8 or single-antenna port, port 7 or 8 |
| Mode 9 | Non-MBSFN subframe: If the number of PBCH antenna ports is one, Single-antenna port, port 0 is used, otherwise Transmit diversity MBSFN subframe: Single-antenna port, port 7 Up to 8 layer transmission, ports 7-14 or single-antenna port, port 7 or 8 |

For transmission of a CSI, a CSI reporting type configured with a specific period and an offset may be defined. The following may be defined CSI reporting types.

Type 1 report supports CQI feedback at a subband selected by UE

Type 1a report supports second PMI feedback and subband CQI feedback selected by UE Type 2, 2b, and 2c report supports wideband CQI and PMI feedback Type 3 report supports RI feedback Type 4 report supports wideband CQI Type 5 reports supports RI and wideband PMI feedback Type 6 report supports RI and PTI feedback For each serving cell, the period ($N_{pd}$) and offset ($N_{OFFSET,CQI}$) of a sub-frame for the UE to do CQI/PMI reporting may be determined by a parameter, cqi-pmi-ConfigIndex ($I_{CQI/PMI}$). Further, for each serving cell, the period ($M_{RI}$) and offset ($N_{OFFSET,RI}$) of a sub-frame for the UE to do RI reporting may be determined by a parameter, ri-ConfigIndex ($I_{RI}$). The parameter cqi-pmi-ConfigIndex and the parameter ri-ConfigIndex may be configured based on higher layer signaling. The offset ($N_{OFFSET,RI}$) for RI may be set to one of the values in the set $\{0,-1,\ldots,-(N_{pd}-1)\}$.

If the UE is configured to do CSI reporting on a set of one or more CSI sub-frames, the parameter cqi-pmi-ConfigIndex and the parameter ri-ConfigIndex may be configured for their respective CSI sub-frame sets.

(2) Aperiodic CSI Reporting

In case a PUSCH scheduling control signal (UL grant) transmitted from the base station through a PDCCH contains an aperiodic CQI request that is a control signal requesting transmission of a CQI, the UE may perform aperiodic CSI reporting through a PUSCH.

Table 20 that follows shows modes when CQI/PMI/RI are transmitted through a PUSCH.

TABLE 20

| | | PMI Feedback Type | |
|---|---|---|---|
| | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

In aperiodic CSI reporting, CSI reporting may be done based on different modes according to transmission modes as follows:

CSI Reporting Modes as Per Transmission Modes

Transmission mode 1: Modes 2-0, 3-0

Transmission mode 2: Modes 2-0, 3-0

Transmission mode 3: Modes 2-0, 3-0

Transmission mode 4: Modes 1-2, 2-2, 3-1

Transmission mode 5: Modes 3-1

Transmission mode 6: Modes 1-2, 2-2, 3-1

Transmission mode 7: Modes 2-0, 3-0

Transmission mode 8: in case the UE is configured to do PMI/RI reporting, Modes 1-2, 2-2, 3-1, and in case the UE is configured not to do PMI/RI reporting, Modes 2-0, 3-0.

Transmission mode 9: in case the UE is configured to do PMI/RI reporting and the number of CSI-RS ports is more than 1, Modes 1-2, 2-2, 3-1, and in case the UE is configured not to do PMI/RI reporting or the number of CSI-RS ports is 1, Modes 2-0, 3-0.

Transmission mode 10: in case the UE is configured to do PMI/RI reporting and the number of CSI-RS ports is more than 1, Modes 1-2, 2-2, 3-1, and in case the UE is configured not to do PMI/RI reporting and the number of CSI-RS ports is 1, Modes 2-0, 3-0.

The UE may receive a CSI transmission mode configuration from a higher layer, and the UE may transmit CQI, PMI, and/or RI through the PUSCH of the same sub-frame based on the CSI transmission mode. Each CSI transmission mode may be given as follows:

1-1) Mode 1-2

Mode 1-2 may allow for selection of a precoding matrix under the assumption that data is transmitted only through each subband. The UE may generate a CQI assuming the selected precoding matrix on the overall band (set S) designated by a higher layer or a system band. The UE may transmit the CQI and the PMI value of each subband. The size of each subband may vary depending on the size of the system band.

1-2) Mode 2-0

In mode 2-0, the UE may select M preferred subbands for a band (set S) designated by a higher layer or system band. The UE may generate one CQI assuming transmission of data on the M selected subbands. The UE may generate one additional CQI (wideband CQI) for the system band or set S. In case multiple codewords are present for the M selected subbands, the CQI for each codeword may be defined in a differential form as follows:

Differential CQI=index corresponding to the CQI for the M selected subbands–wideband CQI index The UE transmits information about the position of the M selected subbands, one CQI for the M selected subbands, and the CQI value generated for the entire band or set S. In this case, the size of subbands and M may vary depending on the size of the system band.

1-3) Mode 2-2

In mode 2-2, the UE may simultaneously select the position of M preferred subbands and a single precoding matrix of the M preferred subbands under the assumption that the UE transmits data through M selected subbands. The CQI for the M preferred subbands may be defined for each codeword. The UE may generate an additional CQI (wideband CQI) for the system band or set S. The UE may transmit information regarding the position of the M preferred subbands, one CQI for the M selected subbands, a single precoding matrix index for the M preferred subbands, the wideband precoding matrix index, and wideband CQI. In this case, the size of subbands and M may vary depending on the size of the system band.

1-4) Mode 3-0

In mode 3-0, the UE may generate a wideband CQI. The UE generates a CQI for each subband under the assumption that the UE transmits data through each subband. In this case, although RI>1, the CQI shows the CQI value for the first codeword only.

1-5) Mode 3-1

In mode 3-1, the UE may generate a single precoding matrix for the system band or set S. The UE may generate a subband CQI per codeword assuming the single precoding matrix generated for each subband. The UE generates a wideband CQI assuming the single precoding matrix. The CQI for each subband may be represented in a differential form.

Subband CQI=subband CQI index–wideband CQI index

The size of each subband may vary depending on the size of the system band.

The UE may periodically or aperiodically transmit, through an uplink channel, SRSs (Sounding Reference Signals) as well as CSIs.

SRS transmission comes in two types: 1) periodic SRS transmission and 2) aperiodic SRS transmission. Periodic SRS transmission is performed in a sub-frame triggered by a periodic SRS configuration. The periodic SRS configuration includes an SRS period and an SRS sub-frame offset. Given a periodic SRS configuration, a wireless device may periodically transmit SRSs in sub-frames satisfying the periodic SRS configuration. Hereinafter, the sub-frame where an SRS may be transmitted is referred to as an SRS sub-frame. In periodic SRS transmission and aperiodic SRS transmission, an SRS may be transmitted in an SRS sub-frame UE-specifically determined.

The position of the OFDM symbol where the SRS is transmitted may be fixed in the SRS sub-frame. For example, the SRS may be transmitted at the last OFDM symbol of the SRS sub-frame. The OFDM symbol where the SRS is transmitted is referred to as a sounding reference symbol.

The 3GPP LTE standard defines a cell-specific Srs sub-frame and a UE-specific SRS sub-frame for periodic SRS transmission. The cell-specific SRS sub-frame is commonly configured for all the wireless devices in a cell. As set forth in 3GPP TS 36.211 V8.7.0, Ch. 5.5.3, the cell-specific SRS sub-frame is configured with a configuration period $T_{SFC}$ and a transmission offset by a variable, srs-SubframeConfig. The cell-specific SRS sub-frame is a sub-frame meeting floor($n_s/2$)mod $T_{SFC} \in T_{SCF}$ ($n_s$ is a slot number in a radio frame).

Table 21 that follows shows an exemplary configuration for a cell-specific sub-frame in FDD.

TABLE 21

| srs-SubframeConfig | Configuration Period $T_{SFC}$ | Transmission offset $\Delta_{SFC}$ |
|---|---|---|
| 0 | 1 | {0} |
| 1 | 2 | {0} |
| 2 | 2 | {1} |
| 3 | 5 | {0} |
| 4 | 5 | {1} |
| 5 | 5 | {2} |
| 6 | 5 | {3} |
| 7 | 5 | {0, 1} |
| 8 | 5 | {2, 3} |
| 9 | 10 | {0} |
| 10 | 10 | {1} |
| 11 | 10 | {2} |
| 12 | 10 | {3} |
| 13 | 10 | {0, 1, 2, 3, 4, 6, 8} |
| 14 | 10 | {0, 1, 2, 3, 4, 5, 6, 8 } |
| 15 | reserved | reserved |

The UE-specific SRS sub-frame is configured by signaling specific to a wireless device. As set forth in 3GPP TS 36.213 V8.7.0, Ch. 8.2, the UE-specific SRS sub-frame is configured, by a variable called an SRS configuration index $I_{SRS}$ with an SRS period, TSRS, and an SRS sub-frame offset $T_{offset}$. In FDD, the UE-specific SRS sub-frame is a sub-frame satisfying $(10 \cdot n_f + k_{SRS} - T_{offset,1})$mod $T_{SRS,1}=0$ ($n_f$ is a system frame number, and $k_{SRS}=\{0,1,\ldots,9\}$ a sub-frame number in a radio frame).

The following table shows an exemplary configuration for a UE-specific sub-frame in FDD.

TABLE 22

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$ - 2 |
| 7-16 | 10 | $I_{SRS}$ - 7 |
| 17-36 | 20 | $I_{SRS}$ - 17 |
| 37-76 | 40 | $I_{SRS}$ - 37 |
| 77-156 | 80 | $I_{SRS}$ - 77 |
| 157-316 | 160 | $I_{SRS}$ - 157 |
| 317-636 | 320 | $I_{SRS}$ - 317 |
| 637-1023 | reserved | reserved |

FIG. 17 illustrates an example of periodic SRS transmission.

When the configuration period of the cell-specific SRS sub-frame is $T_{SFC}=2$, and the SRS period of the cell-specific SRS sub-frame is $T_{SRS}=10$, the UE-specific SRS sub-frame belongs to the cell-specific SRS sub-frame, and the wireless device may transmit an SRS in the cell-specific SRS sub-frame.

Aperiodic SRS transmission is conducted when an SRS request from the base station is detected. For aperiodic SRS transmission, an SRS configuration is given in advance. The SRS configuration also includes an SRS period, TSRS, and an SRS sub-frame offset $T_{offset}$.

The SRS request for triggering aperiodic SRS transmission may be contained in the UL grant or DL grant on the PDCCH. For example, if the SRS request is one bit, '0' may indicate a negative SRS request, and if '1,' a positive SRS request. If the SRS request is two bits, '00' may indicate a negative SRS request, and the rest a positive SRS request, with one of the plurality of SRS configurations for SRS transmission selected.

Unless the DL grant or UL grant contains a CI, an SRS may be transmitted in the serving cell of the PDCCH from which an SRS request has been detected. If the DL grant or UL grant contains a CI, an SRS may be transmitted in the serving cell indicated by the CI.

Assume that a positive SRS request is detected in sub-frame n of serving cell c. If the positive SRS request is detected, an SRS is transmitted in the first sub-frame meeting n+k, k≥4, and $T_{SRS}>2$ in TDD (Time Division Duplex) and $(10 \cdot n_f + k_{SRS} - T_{offset})$ mod $T_{SRS}=0$ in FDD (Frequency Division Duplex). In FDD, the sub-frames in frame of have sub-frame indexes $k_{SRS}=\{0,1,\ldots,9\}$, and in TDD, $k_{SRS}$ is defined in a predetermined table. In TDD with $T_{SRS}=2$, an SRS is transmitted in the first sub-frame satisfying ($k_{SRS}-T_{offset}$)mod 5=0.

FIG. 18 illustrates an example of aperiodic SRS transmission.

Let's say that an SRS configuration includes an SRS period, $T_{SRS}=5$, and an SRS sub-frame offset, $T_{offset}=0$.

Assume also that as per the SRS configuration, sub-frame n+1 and sub-frame n+6 are sub-frames where SRS transmission may be possible.

If an SRS request is detected from the PDCCH of sub-frame n, an SRS is transmitted in sub-frame n+6, the first sub-frame satisfying the SRS configuration after sub-frame n+4.

In sub-frame i of serving cell c, the transmit power of a sounding reference symbol, $P_{SRS,c}(i)$, is defined as follows.

$$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\} \qquad \text{<Equation 5>}$$

where, $P_{CMAX,c}(i)$ is the transmit power configured in sub-frame i of serving cell c, $P_{SRS\_OFFSET,c}(m)$ is a four-bit UE-specific parameter semi-statically configured by a higher layer for m=0 and m=1 of serving cell c, wherein if periodic SRS m=0, if aperiodic SRS m=1, $M_{SRS,c}$ is the bandwidth of SRS transmission in sub-frame i of serving cell c, $P_{O\_PUSCH,c}(j)$ is a parameter constituted of the sum of PO_NOMINAL_PUSCH,c(j), which is a cell-specific nominal component given by a higher layer in sub-frame i of serving cell c and $P_{O\_UE\_PUSCH,c(j)}$, which is a UE-specific component, j=1, $\alpha_c(j)$ is a three-bit parameter given by a higher layer for serving cell c, j=1, PLc is an estimated downlink pathloss value computed by the wireless device for serving cell c, $f_c(i)$ is the current PUSCH power control adjusted state for serving cell c.

Assumption may be given to an environment where a plurality of cells and a UE having the same downlink carrier center frequency do networking. For ease of description, under the assumed environment, communication is carried out between a UE and two cells (first cell and second cell) that are of the same downlink carrier center frequency. For example, the first cell and the second cell may be a P-cell and an S-cell, respectively. In this case, the two cells may be positioned physically in the same or different sites. The UE may maintain downlink sync with each cell based on the sync signals (PSS/SSS) contained in the downlink data transmitted from the first and second cell. Further, the UE may receive control data transmitted through a control channel such as a PDCCH, to obtain downlink scheduling information from each cell. The UE may receive a PDSCH transmitted from each cell based on the obtained downlink scheduling information.

The UE may make use of a plurality of receiver in order to receive the downlink data from each cell. The plurality of receivers of the UE may get efficient rid of interference that arises due to transmission from the plurality of cells. Information regarding the capabilities of the receivers to remove interference may be transmitted from the UE to each cell at the early time when the cells and the UE initiate access to each other, and such information may be put in use for access configuration between the cells and the UE.

Assuming that the downlink sub-frames transmitted from the plurality of cells are of the same timing, the sync signals (PSS/SSS) transmitted from the plurality of cells may be at the same position. In such case, the UE may have difficulty tracking and maintaining the sync with each cell due to interference between the cells. When receiving downlink data from the cells under this circumstance, the UE needs to separately figure out the sync with each cell.

Assuming, for example, that each cell is a small cell, the distance between the plurality of cells may be short. Accordingly, it is highly likely that the downlink data transmitted from the small cells have a small propagation delay and that downlink sub-frames transmitted from the plurality of small cells are received by the UE at nearly the same time. In such situation, the PSSs/SSSs and CRSs from the plurality of cells may be received by the UE at the same timing. Since a CRS has a frequency shift, the UE may make distinctions between the reference signals respectively transmitted from the cells. However, the PSSs/SSSs from the cells may cause inter-cell interference, and accordingly, the UE may fail to establish a sync to receive the downlink data transmitted from the plurality of cells. This incurs differences in capabilities between UEs.

To address such issues, the UE may be configured not to receive, in duplicate, the sync signals respectively transmitted from the cells.

Figure 19:
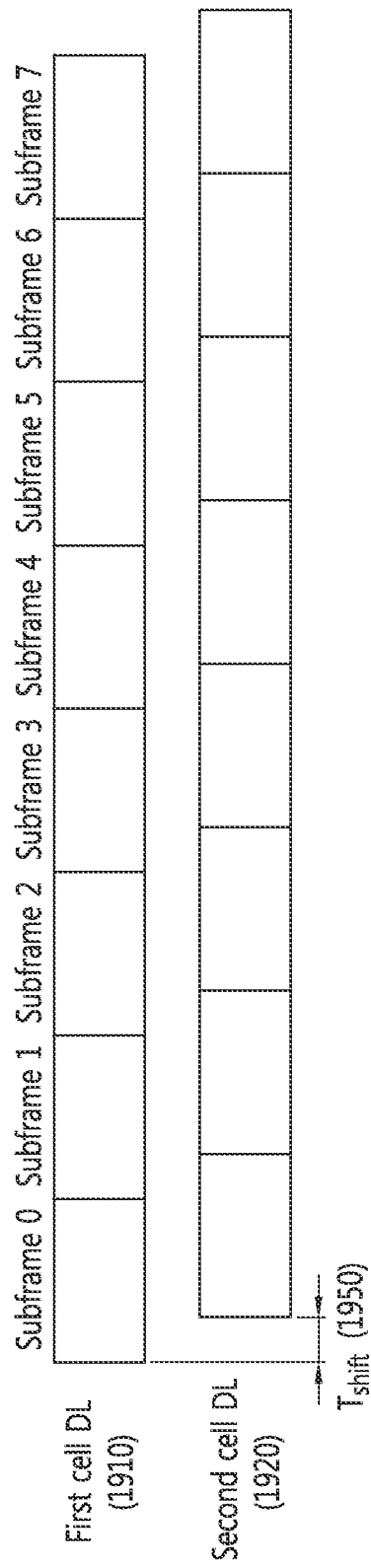
FIG. 19 is a concept view illustrating a downlink subframe transmitted from a plurality of cells according to an embodiment of the present invention.

FIG. 19 is a concept view illustrating a downlink sub-frame transmitted from a plurality of cells according to an embodiment of the present invention.

Referring to FIG. 19, a timing offset may be assigned to prevent an overlap between a sync signal transmitted from a first cell 1910 through a downlink sub-frame and a sync signal transmitted from a second cell 1920 through a downlink sub-frame. For instance, in LTE/LTE-A FDD systems, PSSs/SSSs are transmitted over two consecutive OFDM symbols, respectively. Accordingly, a downlink transmission offset 1950 corresponding to the two OFDM symbols may be given between the first cell 1910 and the second cell 1920. However, a downlink transmission offset 1950 corresponding to a different number of OFDM symbols or a sub-frame may be provided to the plurality of cells to perform downlink transmission.

In case the downlink transmission offset 1950 corresponds to one sub-frame, only the sub-frame indexes between the first cell and the second cell may differ from each other.

Assume, as shown in FIG. 19, that the downlink transmission offset 1950, Tshift, corresponds to an OFDM symbol(s) that is smaller than one sub-frame and that the UE receives PDSCHs transmitted from the first cell 1910 and the second cell 1920 at nth sub-frame timings. In such case, after decoding PDSCH data, the UE may transmit ACK/NACK information for the PDSCH at a predetermined transmission timing after receiving the PDSCH data. For example, in LTE/LTE-A systems, the UE receives a PDSCH, and four sub-frames after receiving the PDSCH, the UE may transmit an ACK/NACK for the PDSCH. In case a downlink transmission offset is present between the downlink data transmitted from the first cell 1910 and the second cell 1920 in order to avoid interference between sync signals, the UE may lack a processing time necessary for transmitting ACKs/NACKs for the PDSCHs received from the first cell 1910 and the second cell 1920. The base stations, in the case of presence of the downlink transmission offset, may be insufficient of a processing time required to perform ACK/NACK processing. Now described is an ACK/NACK procedure when a downlink transmission offset exists between downlink data transmitted from a plurality of cells, according to an embodiment of the present invention. In the following embodiment, the plurality of cells (first cell and second cell) may have the same center frequency.

In the instant embodiment, the cell that serves as a reference to produce the downlink transmission offset is denoted a reference cell. The time of transmitting downlink data or uplink data with respect to the reference cell is referred to as a reference time. In contrast, the cell delaying its transmission by the downlink transmission offset with respect to the reference cell is denoted a downlink transmission offset applied cell, and the time of transmission of downlink data and uplink data with respect to the downlink transmission offset applied cell is denoted a downlink transmission offset applied time. Described is an example where a downlink transmission offset applies to delay data reception to be later than a reference time according to an embodiment of the present invention. However, this is merely for ease of description, and a downlink transmission offset may apply to put data reception earlier than the reference time. The information about the downlink transmission offset may contain information regarding a downlink transmission interval between a plurality of cells based on various formats. For example, a downlink transmission offset may be expressed as an interval between a first OFDM symbol corresponding to a PSS or SSS transmitted from the first cell and a second OFDM symbol corresponding to a PSS or SSS transmitted from the second cell.

Figure 20:
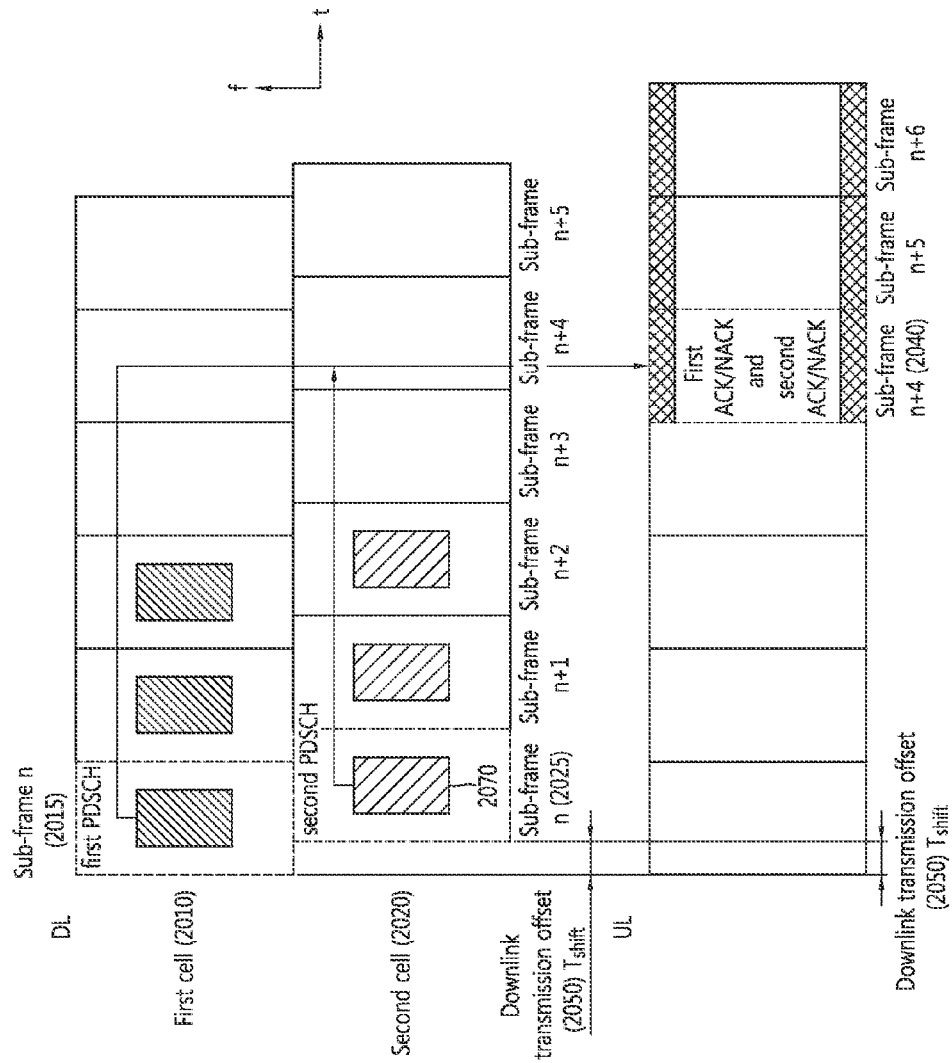
FIG. 20 is a concept view illustrating an ACK/NACK procedure when there is a downlink transmission offset according to an embodiment of the present invention.

FIG. 20 is a concept view illustrating an ACK/NACK procedure when there is a downlink transmission offset according to an embodiment of the present invention.

FIG. 20 illustrates an ACK/NACK process of a cell and/or a UE when the ACK/NACK transmission timing of a downlink transmission offset applied cell fits into the ACK/NACK transmission timing of a reference cell. It is assumed that the first cell 2010 is the reference cell, and the second cell 2020 is the downlink transmission offset applied cell.

For example, the UE may transmit an ACK/NACK for a PDSCH received through an nth sub-frame 2015 of the first cell 2010 in an n+4th uplink sub-frame 2040 with respect to the nth sub-frame 2015 of the first cell 2010. In the case of fitting the ACK/NACK transmission timing of the downlink transmission offset applied cell into the ACK/NACK transmission timing of the cell having the reference time among a plurality of cells, the UE may transmit an ACK/NACK for a PDSCH received through an nth downlink sub-frame 2025 of the second cell 2020 in the n+4th uplink sub-frame 2040 determined with respect to the reference time of the first cell, 2010.

A downlink transmission offset 2050, Tshift, may be present between the nth downlink sub-frame 2025 of the second cell 2020 and the nth sub-frame 2015 of the first cell 2010. In such case, the UE decodes the PDSCH transmitted through the nth sub-frame 2025 of the second cell 2020 and then transmits an ACK/NACK for the PDSCH in the n+4th uplink sub-frame 2040 determined with respect to the reference time of the first cell 2010. That is, in order for the UE to transmit the ACK/NACK for the PDSCH transmitted through the nth sub-frame 2025 of the second cell 2020 in compliance with the ACK/NACK transmission timing of the first cell 2010, the processing time may be reduced by Tshift as compared with the processing time for existing ACK/NACK processes. For example, consider the case where the downlink data from the first cell 2010 is transmitted faster than downlink data from the second cell 2020 by the downlink transmission offset 2050 that corresponds to two OFDM symbols. In such case, the UE transmits an ACK/NACK for the PDSCH received from the second cell 2020 with respect to the reference time when the UE transmits an ACK/NACK to the first cell 2010. Thus, the UE may perform an ACK/NACK process with a processing time reduced by two OFDM symbols as compared with the existing processing times.

Accordingly, according to an embodiment of the present invention, the UE's reduced processing time needs to be taken into consideration for adjusting the ACK/NACK transmission timing for the PDSCH received from the downlink transmission offset applied cell with respect to the reference cell. According to an embodiment of the present invention, the size of PDSCH data 2070 transmitted from the downlink transmission offset applied cell (e.g., the second cell) may be limited. In case the limit is put on the PDSCH data 2070 received from the second cell 2020, the downlink transmission offset applied cell, the UE's ACK/NACK processing time may be reduced. Accordingly, the reducing of the PDSCH data 2070 size may make up for the UE's processing time reduced by the downlink transmission offset 2050.

A method for reducing the PDSCH data 2070 size is to limit the downlink data transmitted from the downlink transmission offset applied cell to a predetermined size. In order to restrict the downlink data transmitted from the downlink transmission offset applied cell to a specific size, information regarding the downlink transmission offset 2050 may be placed into consideration. The downlink data may be further shrunken when the downlink transmission offset is larger than when small.

Another method for curtailing the size of PDSCH data is to puncture and transmit the data of some OFDM symbols carrying the PDSCH data 2070.

As still another method, an ACK/NACK for downlink data from the downlink transmission offset applied cell may be transmitted, delayed by one sub-frame with respect to the reference time when the reference cell transmits an ACK/NACK. For example, an ACK/NACK for the PDSCH received from the first cell 2010 through the nth sub-frame 2015 may be transmitted at the n+4th sub-frame timing, and an ACK/NACK for the PDSCH received from the second cell 2020 through the nth sub-frame 2025 applied with the downlink transmission offset may be transmitted at the n+5th sub-frame timing determined with respect to the first cell.

If the ACK/NACK transmission timing of the reference cell fits into the ACK/NACK transmission timing of the downlink transmission offset applied cell, the reference cell may receive the ACK/NACK for the PDSCH earlier by the downlink transmission offset than in existing ACK/NACK processes. In other words, the reference cell may receive an ACK/NACK from the UE more quickly than in the existing ACK/NACK process. If so, the processing time for re-transmission that may be demanded by the reference cell may shorten.

Transmission may be carried out with the ACK/NACK transmission timing of the downlink transmission offset applied cell consistent with that of each cell. In case the ACK/NACK transmission timing fits into the sub-frame of each cell, as large a transmission timing gap as the timing offset may be present between the ACK/NACK transmitted to the first cell and the ACK/NACK transmitted to the second cell. The UE may generate an ACK/NACK to be transmitted to each cell using, e.g., the base sequence, cyclic shift, or orthogonal cover sequence determined based on the identifier of each cell. According to an embodiment of the present invention, the ACK/NACK transmission timing may be fixed to enable simultaneous transmission of ACKs/NACKs responsive to the PDSCHs received from a plurality of cells, as described supra. According to an embodiment of the present invention, a common resource may be reserved for use in ACK/NACK transmission to the plurality of cells. The UE may transmit ACKs/NACKs for the plurality of cells through the reserved resource. In this scenario, virtual cell identifiers, on behalf of physical cell identifiers, may be put in use to make distinctions between base sequences, cyclic shifts, or orthogonal cover sequences. By way of example, the UE may transmit an ACK/NACK for the first cell and an ACK/NACK for the second cell through a resource reserved in a sub-frame. The first cell may demodulate the ACK/NACK transmitted from the UE based on the virtual cell identifier of the first cell to obtain the ACK/NACK for the first PDSCH transmitted from the first cell. The second cell may demodulate the ACK/NACK transmitted from the UE based on the virtual cell identifier of the second cell to obtain the ACK/NACK for the second PDSCH transmitted from the second cell. As another example, the UE may generate an ACK/NACK for the first cell and an ACK/NACK for the second cell based on one virtual cell identifier, and the UE may transmit the generated ACKs/NACKs to the first cell and the second cell, respectively. The first cell and the second cell may receive the ACKs/NACKs generated based on the virtual cell identifier. The first cell and the second cell may obtain the ACK/NACK for each cell from the ACK/NACK payload decoded based on the virtual cell identifier. The ACK/NACK of each cell may be positioned in the ACK/NACK payload in various manners.

Now described is a method for determining a resource for transmitting ACKs/NACKs to a plurality of cells according to an embodiment of the present invention.

A PUCCH resource may be allocated to the UE through implicit mapping (dynamic mapping) or explicit mapping (or static mapping). Implicit mapping is the scheme where the UE chooses a PUCCH resource index based on the smallest CCE index of the PDCCH transmitted through a downlink and this scheme does not require separate signaling for indicating a PUCCH resource index. That is, the resource index of the PUCCH where an ACK/NACK signal for a specific PDSCH is transmitted may be determined by a predetermined rule based on the smallest CCE index (nCCE) of the PDCCH scheduling the PDSCH. For instance, in FDD systems, a PUCCH resource index may be determined as follows: nPUCCH(1,p)=nCCE+NPUCCH(1) NPUCCH(1) may be set by a higher layer.

Explicit mapping is the scheme where a base station directly informs the UE of a PUCCH resource index or its related parameter through a certain field in a DCI format. For example, the base station may inform, through a higher layer, the UE of the resource indexes of four candidate PUCCHs where an ACK/NACK signal for an SPS PDSCH may be transmitted. Thereafter, the base station may directly notify the UE of which one of four PUCCH resource indexes configured by two bits in the TPC (transmit power control) field of the DCI format indicating SPS activation is to be used to transmit an ACK/NACK signal for the SPS PDSCH.

According to an embodiment of the present invention, an additional variable, NPUCCH(n), may be defined to determine a resource in order to transmit ACKs/NACKs for the plurality of cells through different PUCCH resources.

As an example, the UE may define and use NPUCCH(1) and NPUCCH(2) to determine resources for transmitting an ACK/NACK for the first cell and an ACK/NACK for the second cell.

Figure 21:
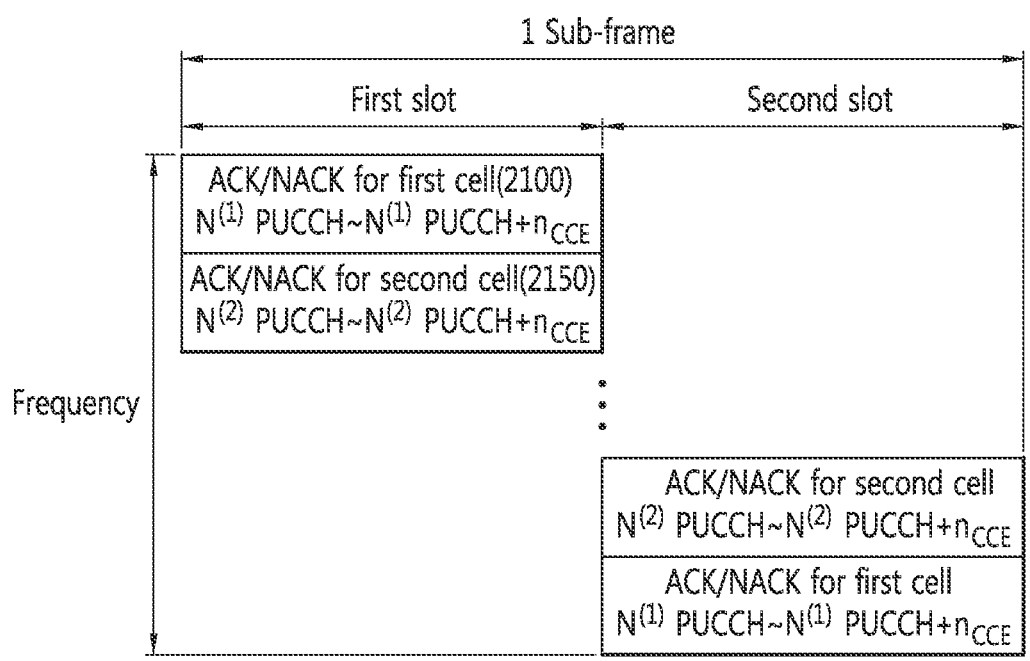
FIG. 21 is a concept view illustrating allocation of PUCCH resources according to an embodiment of the present invention.

FIG. 21 is a concept view illustrating allocation of PUCCH resources according to an embodiment of the present invention.

FIG. 21 illustrates a method for determining an uplink resource to transmit ACKs/NACKs for a first cell and a second cell. Assume in connection with FIG. 21 that an ACK/NACK for the first cell and an ACK/NACK for the second cell are transmitted based on PUCCH format 1/1a/1b.

The resource index of PUCCH format 1/1a/1b for transmission of the ACK/NACK 2100 for the first cell may be determined like nPUCCH=nCCE+NPUCCH(1). nCCE is the smallest CCE index where a PDCCH has been detected corresponding to the PDCCH requiring ACK/NACK signal transmission or the PDSCH requiring ACK/NACK signal transmission.

The resource index of PUCCH format 1/1a/1b for transmission of the ACK/NACK 2150 for the second cell may be determined like nPUCCH=nCCE+NPUCCH(2). Likewise, nCCE is the smallest CCE index where a PDCCH has been detected corresponding to the PDCCH requiring ACK/NACK signal transmission or the PDSCH requiring ACK/NACK signal transmission.

That is, in case the UE conducts dynamic mapping on the PUCCH resource to transmit ACKs/NACKs for the downlink data transmitted from the plurality of cells, the UE may determine an NPUCCH(n) (n is a natural number>1) for transmitting an ACK/NACK to each cell. The UE may determine a resource for transmission of an ACK/NACK to each cell based on the determined NPUCCH(n). Information about NPUCCH(n) may be transmitted from a higher layer.

A CSI feedback method by a UE is now described, according to an embodiment of the present invention.

Figure 22:
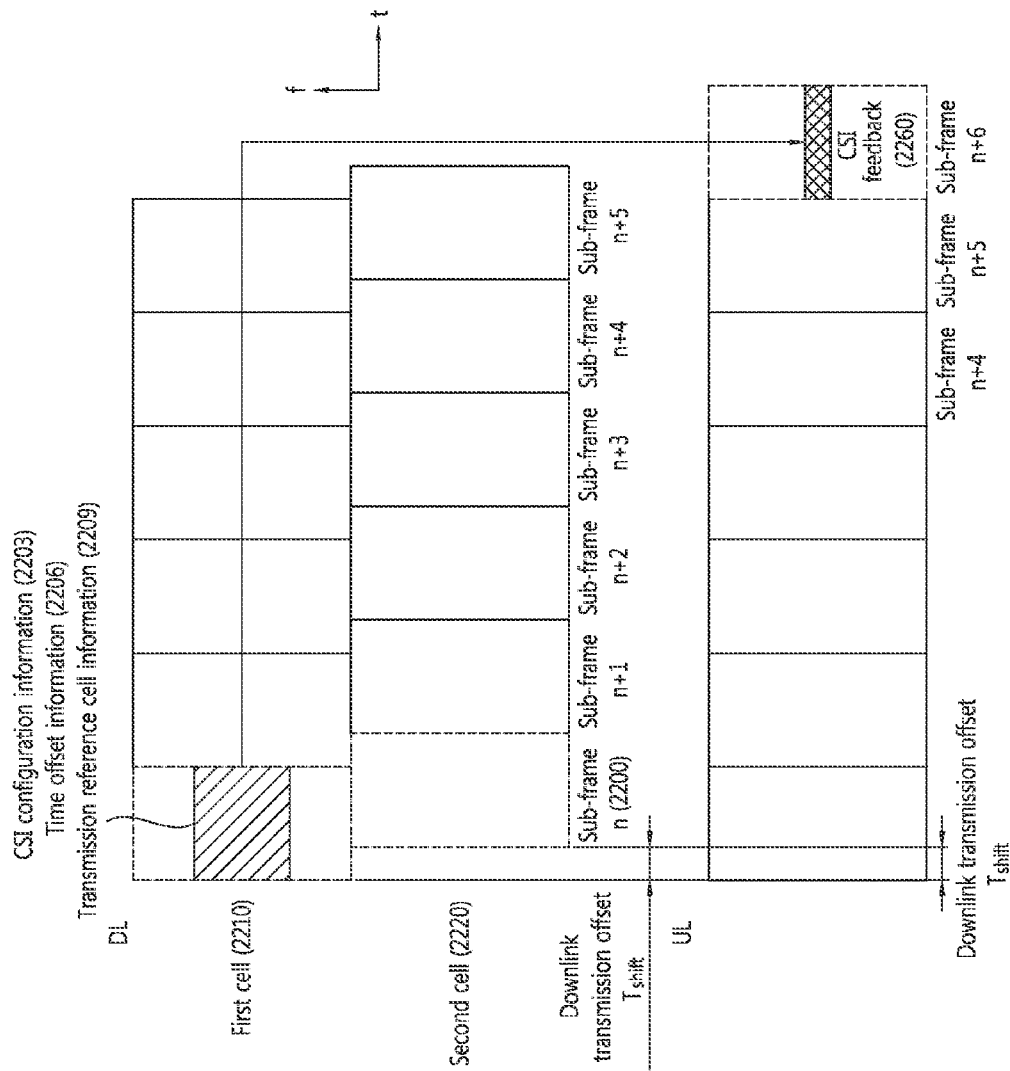
FIG. 22 is a concept view illustrating a CSI feedback method according to an embodiment of the present invention.

FIG. 22 is a concept view illustrating a CSI feedback method according to an embodiment of the present invention.

Described is an example where, in connection with FIG. 22, a downlink transmission offset is present between the downlink data transmitted from the first cell 2210 and the downlink data transmitted from the second cell 2220 and the UE transmits a CSI feedback in response to a request from the first cell 2210 or the second cell 2220.

The UE may receive all the control information from the first cell 2210 and might not decode a PBCH transmitted from the second cell 2220. Under the instant situation, the UE might not be aware of the frame boundary information of the sub-frame transmitted from the second cell 2220. In other words, the UE, when conducting CSI feedback with respect to a downlink transmission timing, might not catch the timing when a CSI feedback is transmitted. Accordingly, according to an embodiment of the present invention, each base station may transmit, to the UE, configuration information for transmission of a CSI feedback 2260 with respect to the downlink transmission offset applied time of the downlink transmission offset applied cell.

The UE may perform an operation that follows to transmit a periodic CSI. By way of example, the UE may receive CSI (channel state information) configuration information 2230, downlink transmission offset information 2206, and transmission reference cell information 2209 from the first cell 2210 or the second cell 2220. In connection with FIG. 22, the UE is assumed to receive the CSI configuration information 2203, the downlink transmission offset information 2206 and the transmission reference cell information 2209 through the first cell 2210. For the purpose of description, it is assumed in connection with FIG. 22 that the first cell 2210 transmits the CSI configuration information 2203, the downlink transmission offset information 2206 and the transmission reference cell information 2209 through the PDSCH included in one sub-frame 2200. However, the CSI configuration information 2203, the downlink transmission offset information 2206, and the transmission reference cell information 2209 may be transmitted through control channels or data channels in different sub-frames. According to an embodiment of the present invention, the base station may transmit only the downlink transmission offset information 2206 without separately transmitting the transmission reference cell information 2209. For example, the UE, once receiving information about the downlink transmission offset, may be configured to transmit CSI based on the downlink transmission offset applied cell.

The CSI configuration information 2203 transmitted from the first cell 2210 or the second cell 2220 may contain information for determining a CSI transmission period or CSI transmission offset information. The uplink sub-frame through the UE transmits periodic CSI may be determined based on the CSI transmission period or CSI transmission offset information. The transmission reference cell information 2206 may contain information regarding the cell that serves as a reference for determining the UE's uplink transmission timing. As an example, the transmission reference cell information 2209 may contain information as to whether the transmission reference cell is the first cell or the second cell. The downlink transmission offset information may include information about the uplink timing when the UE transmits CSI. The second cell 2220 is the downlink transmission offset applied cell, and the UE might not be aware of the frame boundary information on the second cell's downlink transmission as set forth above. Accordingly, in case the transmission reference cell is the second cell 2220, the uplink transmission timing of transmission of CSI with respect to the second cell 2220 may be determined based on the downlink transmission offset information. The uplink transmission timing when the UE transmits CSI may be, e.g., the sum of the downlink transmission offset and the uplink transmission timing determined with respect to the downlink transmission timing of the first cell.

That is, the UE may transmit CSI through the uplink sub-frame determined based on the CSI configuration information at the uplink transmission timing determined with respect to the downlink transmission offset.

The same may apply likewise to periodic SRS transmission. The downlink transmission offset information may be determined based on the information on the interval between the first OFDM (orthogonal frequency division multiplexing) symbol corresponding to a PSS (primary synchronization signal) or an SSS (secondary synchronization signal) transmitted from the first cell 2210 and the second OFDM symbol corresponding to a PSS or an SSS transmitted from the second cell 2220.

The first cell 2210 and the second cell 2220 may be a P-cell and an S-cell, respectively, which have been carrier-aggregated. The center frequency of the first cell 2210 may be the same as the center frequency of the second cell 2220, and the downlink transmission timing of the second cell 2220 may be delayed by the downlink transmission offset from the downlink transmission timing of the first cell 2210.

According to another embodiment of the present invention, the sub-frame where the UE transmits periodic CSI may be determined with respect to a radio frame from the second cell, which is the timing offset applied cell. Equation 6 that follows represents determining a sub-frame where periodic CSI (CQI/PMI) is transmitted.

$$(10 \times n_f + \lfloor n_s/2 \rfloor - N_{OFFSET,CQI}) \bmod (N_{pd}) = 0 \qquad \text{<Equation 6>}$$

In Equation 6, $n_f$ is a radio frame index to indicate the radio frame, and $n_s$ a slot index to indicate a slot. NOFFSET, CQI is offset information for determining a per-sub-frame CSI transmission sub-frame, and Npd is information regarding a per-sub-frame CSI transmission period. NOFFSET, CQI and Npd may be determined by periodic CSI configuration information ICQI/PMI transmitted from a higher layer. For example, according to ICQI/PMI, NOFFSET,CQI and Npd may be determined based on a predetermined table.

Equation 7 that follows represents determining a sub-frame where periodic CSI (RI) is transmitted.

$$(10 \times n_f + \lfloor n_s/2 \rfloor - N_{OFFSET,CQI} - N_{OFFSET,RI}) \bmod (N_{pd} \cdot M_{RI}) = 0 \qquad \text{<Equation 7>}$$

$n_f$, $n_s$, $N_{OFFSET,CQI}$ and $N_{pd}$ may be determined by Equation 6.

$N_{OFFSET,CQI}$ and $N_{pd}$ may be determined by CQI-PMI configuration information $I_{CQI/PMI}$ transmitted from a higher layer. $N_{OFFSET,RI}$ and $M_{RI}$ may be determined by RI configuration information $I_{RI}$ transmitted from a higher layer.

According to an embodiment of the present invention, in the equation related to transmission of CSI as above, $n_f$ and $n_s$ may be values determined with respect to the reference cell or downlink transmission offset applied cell. For example, assume an example where the first cell is the radio channel and the second cell is the downlink transmission offset applied cell and the UE transmits CSI with respect to the uplink transmission timing of the second cell, the downlink transmission offset applied cell. As described above, $n_f$ and $n_s$ for determining a sub-frame carrying periodic CSI may be parameters determined based on a radio frame number of the downlink transmission offset applied cell. In contrast, when the UE transmits CSI based on the uplink transmission timing of the first cell, the reference cell, $n_f$ and $n_s$ for determining a sub-frame carrying periodic CSI may be parameters based on a radio frame number determined based on the transmission timing of the reference cell. The UE may conduct uplink transmission based on $n_f$ and $n_s$ determined as per downlink transmission sync for the first cell or the second cell. The uplink sub-frame where the UE transmits CSI may be transmitted on uplink with uplink transmission sync determined based on the downlink transmission sync for one of the plurality of cells.

The UE may receive information on the downlink transmission offset and information on the transmission reference cell from each base station and may determine $n_s$ and $n_f$ based on the information on the downlink transmission offset and the downlink transmission sync of the transmission reference cell. That is, the uplink transmission sync for the UE's periodic CSI transmission may be determined based on the information on the downlink transmission offset and the downlink transmission sync of the transmission reference cell.

According to another embodiment of the present invention, the UE may receive, from each base station, CSI configuration information indicating the information on the period ($N_{pd}$), the sub-frame offset ($N_{OFFSET,CQI}$), and the reference cell applied with a radio frame number. The reference cell may be a cell that plays a role as a reference for determining a sub-frame where the UE transmits CSI when downlink transmission is conducted from the plurality of cells to the UE. The CSI configuration information indicating the sub-frame offset and the period and the CSI configuration information indicating the information regarding the reference cell applied with a frame number may be transmitted to the UE through different channels or signals, rather than through a single information unit.

The UE may determine the sub-frame carrying the CSI using a CSI transmission sub-frame determination equation such as Equation 6 or 7 based on the received CSI configuration information. In this case, $n_f$ used for determining a CSI transmission sub-frame may be the radio frame number corresponding to the reference cell determined based on the information on the reference cell applied with the radio frame number. $n_s$ may be a slot number in the radio frame corresponding to the radio frame number ($n_f$).

The UE may further receive information on the downlink transmission offset as additional periodic CSI configuration information. In case the reference cell is the first cell or the second cell, the downlink transmission offset information may contain information regarding a difference between the downlink transmission sync of the first cell and the downlink transmission sync of the second cell. The uplink transmission sync of the uplink sub-frame may be determined based on the information on the downlink transmission offset and the downlink transmission sync of the reference cell. The first cell and the second cell may be a P-cell and an S-cell, respectively, which have been carrier-aggregated. The center frequency of the first cell may be the same as the center frequency of the second cell, and the downlink transmission timing of the second cell may be delayed by the downlink transmission offset from the downlink transmission timing of the first cell.

As described above, the downlink transmission offset information may be determined based on the information on the interval between the first OFDM (orthogonal frequency division multiplexing) symbol corresponding to a PSS (primary synchronization signal) or an SSS (secondary synchronization signal) transmitted from the first cell and the second OFDM symbol corresponding to a PSS or an SSS transmitted from the second cell.

The downlink transmission offset information may come in use for aperiodic CSI and SRS transmission as well as periodic CSI and SRS transmission.

Figure 23:
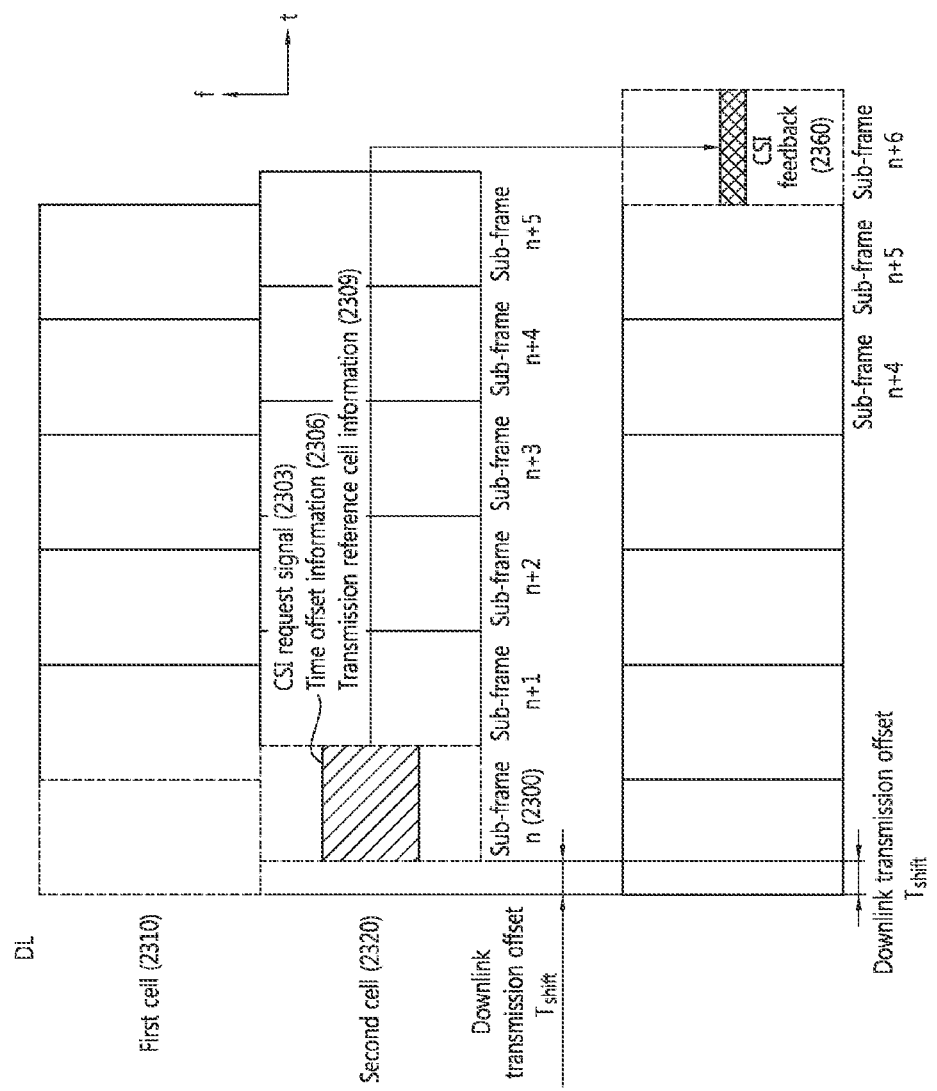
FIG. 23 is a concept view illustrating a CSI feedback method according to an embodiment of the present invention.

FIG. 23 is a concept view illustrating a CSI feedback method according to an embodiment of the present invention.

Described is an example where, in connection with FIG. 23, a downlink transmission offset is present between the downlink data transmitted from the first cell 2310 and the downlink data transmitted from the second cell 2320 and the UE transmits an aperiodic CSI feedback in response to a request from the first cell 2310 or the second cell 2320.

For example, the UE may receive the CSI feedback request signal 2303, the transmission reference cell information 2309, and downlink transmission offset information 2306 from the second cell 2320 through an nth sub-frame 2300. For ease of description, the above information is received from the second cell 2320 through one sub-frame, as an example. However, the UE may receive the CSI feedback request information, the transmission reference cell information, and the downlink transmission offset information from the first cell 2310. Further, the CSI feedback request signal 2303, the transmission reference cell information 2309, and the downlink transmission offset information 2306 may be transmitted through control channels or data channels in different sub-frames.

In case the transmission reference cell of the UE is the second cell 2320, the downlink transmission offset applied cell, the UE may transmit aperiodic CSI through the uplink sub-frame allocated based on the CSI feedback request information at the uplink transmission timing determined with respect to the downlink transmission offset.

That is, the UE may transmit CSI 2360 responsive to the CSI request signal 2303 at the uplink transmission timing determined with respect to the second cell 2320. The uplink transmission timing determined with respect to the second cell 2320 may be determined based on the downlink transmission offset information 2306.

For example, as shown in FIG. 23, the UE may conduct aperiodic CSI feedback 2360 according to a resource allocated based on the CSI request signal 2303 transmitted from the first cell 2310 or the second cell 2320. In case the cell determined based on the received transmission reference cell information 2309 is the downlink transmission offset applied cell, the UE may determine the uplink timing when aperiodic CSI is transmitted based on the downlink transmission offset information 2306. In other words, the UE may transmit a CSI feedback 2360 through the uplink sub-frame determined based on the CSI request signal 2303 at the uplink transmission timing determined based on the downlink transmission offset information.

Like in periodic CSI transmission, the first cell 2310 and the second cell 2320 may be a P-cell and an S-cell, respectively, which have been carrier-aggregated. The center frequency of the first cell 2310 may be the same as the center frequency of the second cell 2320, the second cell 2320 may be a timing offset applied cell, and the downlink transmission timing of the second cell 2320 may be delayed by the downlink transmission offset from the downlink transmission timing of the first cell 2310.

As detailed above, the uplink timing determination method may apply to the UE's periodic SRS transmission and aperiodic SRS transmission, as well as the UE's periodic CSI feedback transmission and aperiodic CSI feedback transmission. For example, assume that the UE carries out SRS transmission with respect to a timing of the S-cell. The UE might not be aware of the SRS transmission timing with respect to the transmission timing of the S-cell for the same reason given for when the UE transmits CSI feedback information. Accordingly, according to an embodiment of the present invention, each base station may transmit transmission reference cell information, downlink transmission offset information, and SRS transmission configuration information in order for the UE to be able to transmit an SRS with respect to the downlink transmission offset applied cell. The SRS transmission configuration information may be varied depending on whether the SRS transmission on uplink is periodic or aperiodic. For aperiodic SRS transmission, the SRS transmission configuration information may be configuration information regarding aperiodic SRS transmission, and for periodic SRS transmission, configuration information for periodic SRS transmission.

The UE may transmit an SRS at the uplink transmission timing determined based on the received downlink transmission offset in case the transmission reference cell is the downlink transmission offset applied cell.

Now described is an example where a plurality of cells transmit PUSCHs to a UE according to an embodiment of the present invention.

Assume an example where information on uplink scheduling is not shared between the plurality of cells and PUSCHs are scheduled from the plurality of cells to the UE. In such case, the scheduled PUSCH resources may overlap one another. If the UE conducts uplink transmission in a 'superposition' manner that transmits different pieces of data in the same resource, the signals received by the cells may contain interference signals that may deteriorate the reception performance of the cells. In case the PUSCH resources scheduled by the plurality of cells overlap each other, the UE may operate as follows. For the purpose of description, the number of cells may be two.

Figure 24:
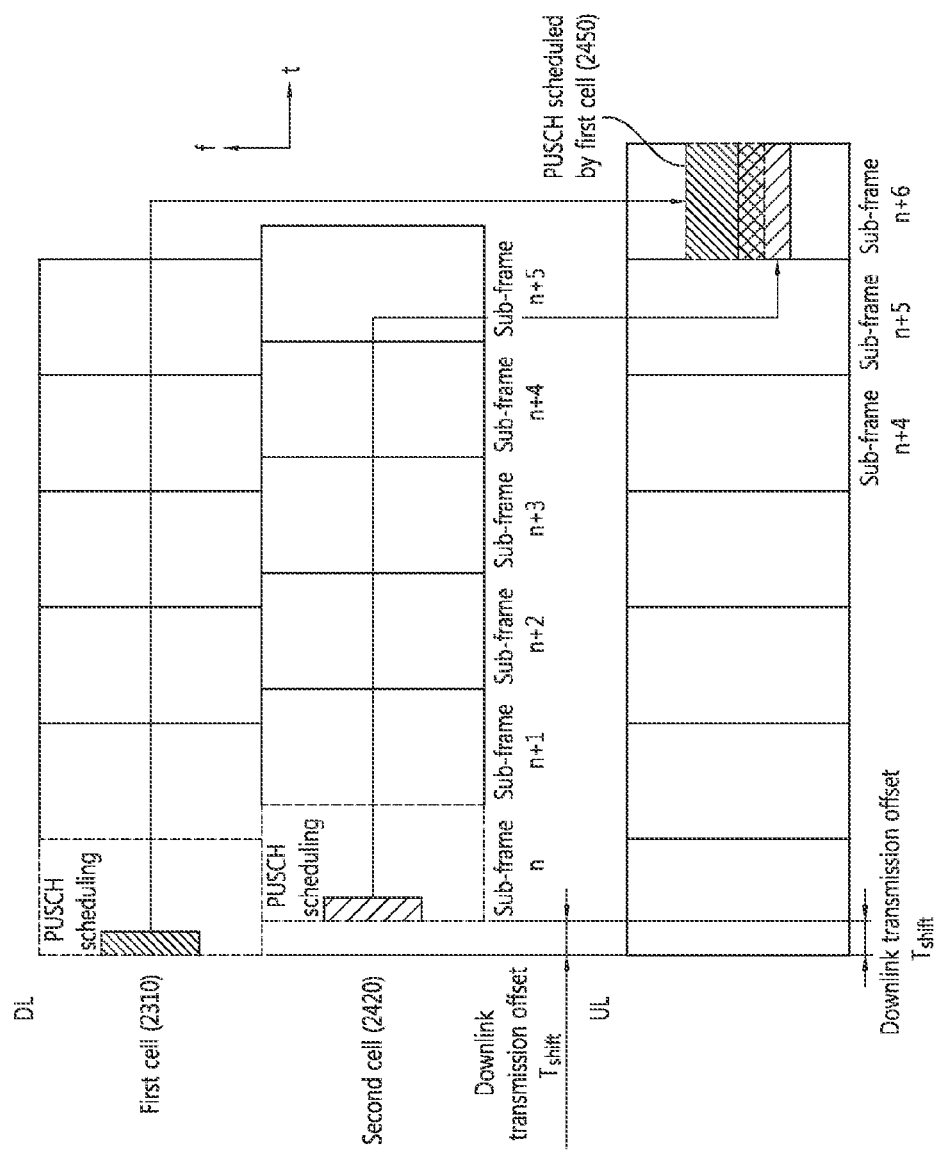
FIG. 24 is a concept view illustrating an uplink transmission operation by a UE according to an embodiment of the present invention.

FIG. 24 is a concept view illustrating an uplink transmission operation by a UE according to an embodiment of the present invention.

As shown in FIG. 24, when receiving the overlapping uplink resources scheduled by the plurality of cells, the UE may transmit the PUSCH scheduled by only one cell.

For example, the UE may uplink data scheduled by a specific one 2410 among the plurality of cells 2410 and 2420 that have scheduled uplink resources. Various methods may come in use for the UE to receive overlapping uplink resource schedules from the plurality of cells 2410 and 2420, select one cell 2410, and transmit the PUSCH 2450 scheduled by the selected cell 2410. For example, if information such as cell indexes is present, the UE may previously determine the priority of transmission between the scheduled PUSCHs, e.g., as if the UE transmits the PUSCH scheduled by a cell with a smaller index number earlier than the others. If the plurality of cells are positioned in physically different sites, scheduling information is difficult to share. Accordingly, none of the cells have information regarding which cell has scheduled the PUSCH that is transmitted from the UE. Each cell 2410 and 2420 may conduct DTX detection on its scheduled PUSCH to determine whether the UE performs uplink transmission on the scheduled PUSCH.

As another method, in case the UE receives overlapping uplink resource schedules from the plurality of cells, the UE might not transmit uplink data through the PUSCH resources scheduled by the plurality of cells. In other words, the UE may use none of the scheduled PUSCHs. Likewise, if the plurality of cells are positioned in physically different sites, scheduling information is difficult to share. Accordingly, it is impossible to determine which cell has scheduled the PUSCH that is transmitted from the UE. Each base station may conduct DTX detection on its scheduled PUSCH to determine whether the UE performs uplink transmission on the scheduled PUSCH.

An embodiment of the present invention may be configured so that one of the plurality of cells schedules a PUSCH. For example, a limitation may be put on each cell's operation so that the plurality of cells do not simultaneously schedule PDSCHs. By way of example, only one cell may perform PUSCH scheduling in a particular sub-frame based on a TDM (time division multiplexing) scheme. As another method, the cell scheduling a PUSCH for the UE may be determined in advance through, e.g., an initial access process between the UE and he cell. For example, the cell scheduling a PUSCH for the UE may be a P-cell (primary cell).

Now described is a method in which a UE transmits SRSs to a plurality of cells according to an embodiment of the present invention.

For aperiodic SRS transmission, each cell may request the UE to transmit an SRS, and the UE may transmit, through an uplink, an SRS generated based on information for SRS transmission determined from the cell (e.g., a base sequence, cyclic shift, frequency comb, or SRS sub-frame).

Figure 25:
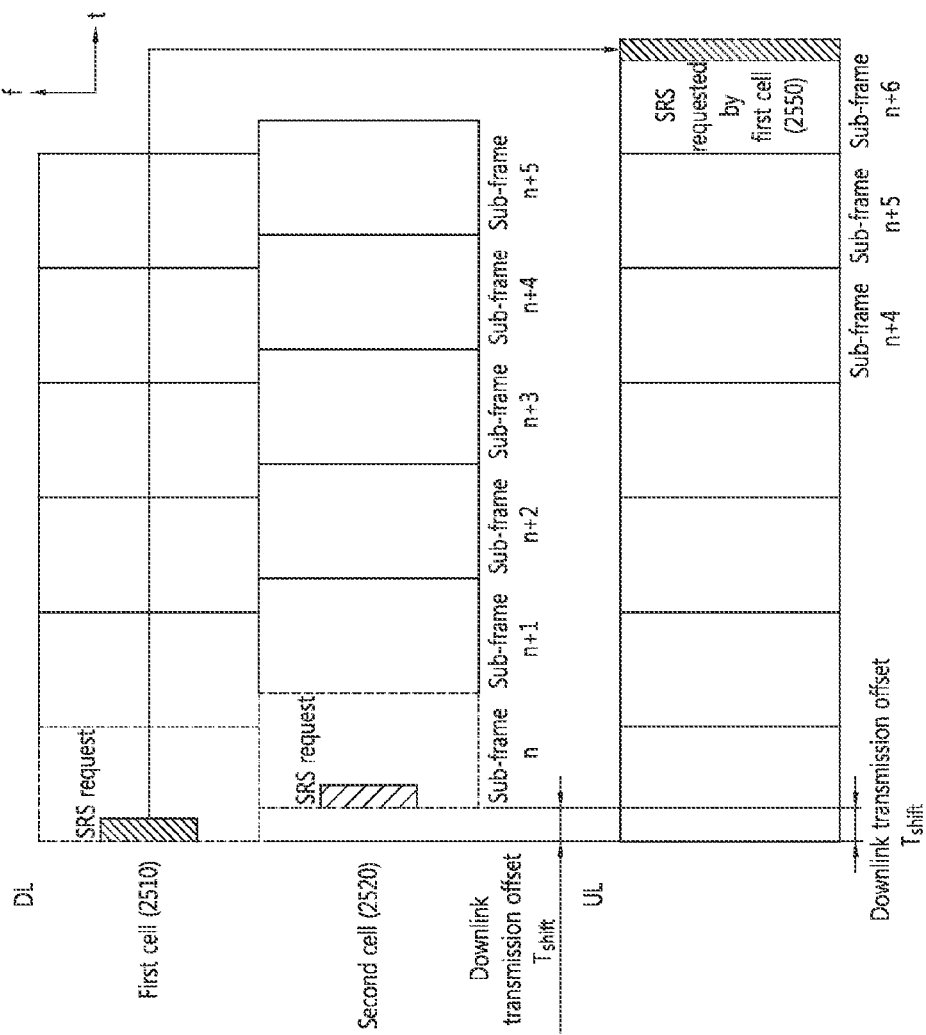
FIG. 25 is a concept view illustrating an example of transmitting an SRS for only one of two cells according to an embodiment of the present invention.

FIG. 25 is a concept view illustrating an example of transmitting an SRS for only one of two cells according to an embodiment of the present invention.

Referring to FIG. 25, in case the SRS transmission resources requested by the plurality of cells 2510 and 2520 overlap each other, the UE may transmit an SRS for only one 2510 of the plurality of cells 2510 and 2520.

For example, the UE may transmit the SRS requested by a particular cell 2510 determined through higher layer signaling earlier than the others. If there is information such as cell indexes, the UE may first transmit an SRS to a cell with a small index number. Like the case of PUSCH scheduling information, if the plurality of cells are located in physically different sites, the SRS request information is difficult to share between the cells. Accordingly, each base station may conduct DTX detection on its SRS transmission request to determine whether an SRS is transmitted through the scheduled resource.

As another method, in case the SRS resources requested by the plurality of cells overlap each other, the UE may transmit none of the SRSs requested by the plurality of cells. Likewise, if the plurality of cells are located in physically different sites, the SRS request information is difficult to share between the cells. Accordingly, the UE cannot determine the cell to which the UE is to transmit a requested cell. Each base station may conduct DTX detection on the requested SRS to determine whether the requested SRS is transmitted from the UE.

As another method, the plurality of cells may be configured to be able to receive an SRS from the UE. The physical cell identifiers used for SRS resources may be replaced with values designated by a higher layer, e.g., virtual cell identifiers, in order for the plurality of cells to receive the SRS. In such case, the plurality of cells may receive the SRS generated based on the virtual cell identifiers, and each cell may demodulate the received SRS based on the virtual cell identifiers.

The UE's uplink power control may be carried out by the following methods.

The first uplink power control method is that the UE transmits an SRS to each cell and configures an independent power control loop. As another method, the UE may transmit an SRS to a cell to establish a power control loop for only the cell.

Power control for ACK/NACK transmission, in case the UE transmits an ACK/NACK to a particular cell, follows a power control operation for the ACK/NACK transmission for the particular cell. The particular cell may be a P-cell (primary cell). In case the UE transmits ACKs/NACKs to the other cells than the particular cell, the UE may follow power control operations for the other cells.

Figure 26:
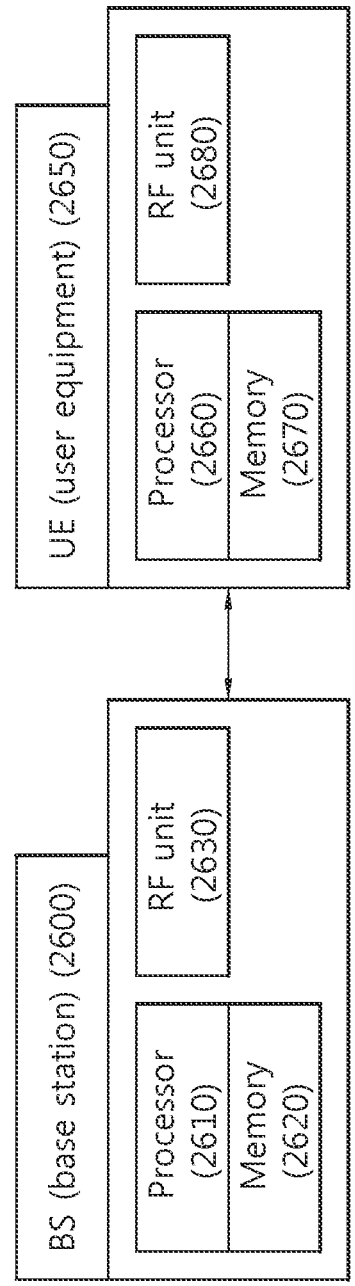
FIG. 26 is a block diagram illustrating a wireless communication system according to an embodiment of the disclosure.

FIG. 26 is a block diagram showing a wireless communication system according to an embodiment of the present invention.

Referring to FIG. 26, a BS 2600 includes a processor 2610, a memory 2620 and a RF unit 2630. The memory 2620 is connected to the processor 2610 and configured to store various information used for the operations for the processor 2610. The RF unit 2630 is connected to the processor 2610 and configured to transmit and/or receive a radio signal. The processor 2610 implements the proposed functions, processed, and/or methods. In the described embodiments, the operation of BS may be implemented by the processor 2610.

For example, the processor 2610 may be implemented to generate CSI configuration information indicating information on a period, sub-frame offset, and the reference cell applied with the radio frame number and to transmit the same to the UE.

A user equipment 2650 includes a processor 2660, a memory 2670 and a RF unit 2680. The memory 2670 is connected to the processor 2660 and configured to store various information used for the operations for the processor 2660. The RF unit 2680 is connected to the processor 2660 and configured to transmit and/or receive a radio signal. The processor 2660 implements the proposed functions, processed, and/or methods. In the described embodiments, the operation of the user equipment may be implemented by the processor 2660.

For example, the processor 2660 may receive periodic CSI configuration information transmitted from the base station and determine an uplink sub-frame according to the periodic CSI configuration information. The processor 2660 may be implemented to transmit periodic CS information through an uplink sub-frame, and the periodic CSI configuration information may contain information on a period, a sub-frame offset, and a reference cell applied with a radio frame number. For example, the uplink sub-frame may meet equation $(10 \times n_f + \lfloor n_s/2 \rfloor - N_{OFFSET,CQI}) \mod (N_{pd}) = 0$. $N_{OFFSET,CQI}$ is the sub-frame offset, $N_{pd}$ the period, $n_f$ the radio frame number corresponding to the reference cell, and $n_s$ a slot number in the radio frame corresponding to the radio frame number.

The processor may include application-specific integrated circuits (ASICs), other chipsets, logic circuits, and/or data processors. The memory may include read-only memory (ROM), random access memory (RAM), flash memory, memory cards, storage media and/or other storage devices.

The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of an uplink transmission comprising:
   receiving, by a user equipment (UE), periodic channel state information (CSI) configuration information;
   determining, by the UE, an uplink subframe according to the periodic CSI configuration information; and
   transmitting, by the UE, periodic CSI through the uplink subframe,
   wherein the periodic CSI configuration information includes information on a period, a subframe offset, and a reference cell to determine a radio frame number,
   wherein the uplink subframe is determined based on the subframe offset, the period, the radio frame number corresponding to the reference cell, and a slot number in a radio frame corresponding to the radio frame number,
   wherein the periodic CSI configuration information further includes information on a downlink transmission offset,
   wherein the reference cell is a first cell or a second cell,
   wherein the information on the downlink transmission offset includes information on a difference between downlink transmission sync of the first cell and downlink transmission sync of the second cell, and
   wherein the uplink transmission sync of the uplink subframe is determined based on the information on the downlink transmission offset and downlink transmission sync of the reference cell.

2. The method of claim 1, wherein the information on the downlink transmission offset includes information on an interval between a first orthogonal frequency division multiplexing (OFDM) symbol corresponding to a primary synchronization signal (PSS) or a secondary synchronization signal (SSS) transmitted from the first cell and a second OFDM symbol corresponding to a PSS or an SSS transmitted from the second cell.

3. The method of claim 1, wherein the first cell is a primary (P)-cell,
   wherein the second cell is an secondary (S)-cell,
   wherein the first cell and the second cell are carrier-aggregated, and
   wherein the second cell is activated by the first cell.

4. The method of claim 1, wherein a center frequency of the first cell is the same as a center frequency of the second cell, and
   wherein a downlink transmission timing of the second cell is delayed by the downlink transmission offset from a downlink transmission timing of the first cell.

5. A user equipment (UE) in a wireless communication system, the UE comprising:
   a radio frequency (RF) unit configured to receive a radio signal;
   a processor operatively connected with the RF unit and configured to:
      receive periodic channel state information (CSI) configuration information,
      determine an uplink sub-frame according to the periodic CSI configuration information, and
      transmit periodic CSI through the uplink sub-frame,
   wherein the periodic CSI configuration information includes information on a period, a sub-frame offset, and a reference cell to determine a radio frame number,
   wherein the uplink sub-frame is determined based on the sub-frame offset, the period, the radio frame number corresponding to the reference cell, and a slot number in a radio frame corresponding to the radio frame number,
   wherein the periodic CSI configuration information further includes information on a downlink transmission offset,
   wherein the reference cell is a first cell or a second cell,
   wherein the information on the downlink transmission offset includes information on a difference between downlink transmission sync of the first cell and downlink transmission sync of the second cell, and
   wherein the uplink transmission sync of the uplink sub-frame is determined based on the information on the downlink transmission offset and downlink transmission sync of the reference cell.

6. The UE of claim 5, wherein the information on the downlink transmission offset includes information on an interval between a first orthogonal frequency division multiplexing (OFDM) symbol corresponding to a primary synchronization signal (PSS) or a secondary synchronization signal (SSS) transmitted from the first cell and a second OFDM symbol corresponding to a PSS or an SSS transmitted from the second cell.

7. The UE of claim 5, wherein the first cell is a primary (P)-cell,
   wherein the second cell is an secondary (S)-cell,
   wherein the first cell and the second cell are carrier-aggregated, and
   wherein the second cell is activated by the first cell.

8. The UE of claim 5, wherein a center frequency of the first cell is the same as a center frequency of the second cell, and
   wherein a downlink transmission timing of the second cell is delayed by the downlink transmission offset from a downlink transmission timing of the first cell.

* * * * *